(12) United States Patent
Mishra et al.

(10) Patent No.: US 11,729,504 B2
(45) Date of Patent: Aug. 15, 2023

(54) METHOD AND ELECTRONIC DEVICE FOR AUTO FOCUS OF SCENE

(71) Applicant: Samsung Electronics Co., Ltd., Suwon-si (KR)

(72) Inventors: Abhishek Mishra, Greater Noida (IN); Rachit Jain, Panchkula (IN); Sai Hemanth Kasaraneni, Macherla (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/849,144

(22) Filed: Jun. 24, 2022

(65) Prior Publication Data

US 2023/0057226 A1 Feb. 23, 2023

Related U.S. Application Data

(63) Continuation of application No. PCT/KR2022/007055, filed on May 17, 2022.

(30) Foreign Application Priority Data

Aug. 23, 2021 (IN) .............................. 202141038095

(51) Int. Cl.
*H04N 23/67* (2023.01)
*H04N 23/60* (2023.01)
*H04N 23/62* (2023.01)

(52) U.S. Cl.
CPC ......... *H04N 23/675* (2023.01); *H04N 23/665* (2023.01); *H04N 23/62* (2023.01)

(58) Field of Classification Search
CPC ...... H04N 23/73; H04N 23/662; H04N 23/71; H04N 23/67; H04N 23/675; H04N 23/45;

(Continued)

(56) References Cited

U.S. PATENT DOCUMENTS 8,089,515 B2 * 1/2012 Chebil .................. G03B 13/36
348/169
8,493,482 B2 7/2013 Cote et al.
(Continued)

FOREIGN PATENT DOCUMENTS

EP 3 793 188 A1 3/2021
EP 3 793 186 A1 6/2021
(Continued)

OTHER PUBLICATIONS

Canon 70D Dual Pixel CMOS AF—A Close Look at the Canon 70D's Dual Pixel CMOS AF (Jul. 2013) (https://www.imaging-resource.com/PRODS/canon-70d/canon-70dDUAL_PIXEL_AF.HTM).

(Continued)

*Primary Examiner* — Pritham D Prabhakher
(74) *Attorney, Agent, or Firm* — Jefferson IP Law, LLP

(57) ABSTRACT

An electronic device for auto focus is provided. The electronic device includes determining, by the electronic device, at least one region of interest (ROI) in a scene displayed in one of a viewfinder and a captured image frame and determining, by the electronic device, at least one sub ROI in the at least one ROI by performing a first level of auto focus using at least one first image sensor. Further, the method includes determining, by the electronic device, at least one focused sub ROI by performing a second level of auto focus on the at least one sub ROI using at least one second image sensor and rendering, by the electronic device, a focus transition for the at least one focused sub ROI to one of the viewfinder and the captured image frame.

20 Claims, 27 Drawing Sheets

(58) Field of Classification Search
CPC ...... H04N 23/13; H04N 23/88; H04N 23/665; H04N 23/62; H04N 13/296; H04N 13/239; H04N 13/243; H04N 5/04
USPC .................................................. 348/207.99
See application file for complete search history.

(56) References Cited

U.S. PATENT DOCUMENTS

| | | | |
|---|---|---|---|
| 8,508,652 B2 | 8/2013 | Albu et al. | |
| 8,659,697 B2 | 2/2014 | Capata et al. | |
| 8,965,045 B2* | 2/2015 | Kalevo | H04N 23/635 382/103 |
| 9,432,568 B2 | 8/2016 | Mlinar et al. | |
| 9,438,868 B2 | 9/2016 | Boettiger | |
| 9,497,397 B1 | 11/2016 | Kleekajai et al. | |
| 9,628,693 B2* | 4/2017 | Liu | H04N 25/704 |
| 9,804,357 B2 | 10/2017 | Galor Gluskin et al. | |
| 10,044,926 B2* | 8/2018 | Galor Gluskin | H04N 23/611 |
| 10,070,042 B2* | 9/2018 | Nikkanen | H04N 17/002 |
| 10,097,747 B2 | 10/2018 | Dayana et al. | |
| 10,264,174 B2 | 4/2019 | Kim et al. | |
| 10,313,579 B2 | 6/2019 | Kadambala et al. | |
| 10,511,746 B2* | 12/2019 | Kim | H04N 23/88 |
| 10,602,055 B2* | 3/2020 | Li | H04N 23/667 |
| 10,757,312 B2 | 8/2020 | Ouyang et al. | |
| 11,122,186 B2* | 9/2021 | Kim | H04N 13/296 |
| 11,373,322 B2* | 6/2022 | Yang | G06T 7/521 |
| 11,599,747 B2* | 3/2023 | Knaan | G06F 18/217 |
| 2010/0045800 A1* | 2/2010 | Chebil | G06T 7/20 348/169 |
| 2014/0267850 A1 | 9/2014 | Li et al. | |
| 2016/0182806 A1 | 6/2016 | Liu | |
| 2017/0272642 A1 | 9/2017 | Zhang et al. | |
| 2018/0131862 A1 | 5/2018 | Galor Gluskin et al. | |
| 2018/0176452 A1 | 6/2018 | Nikkanen et al. | |
| 2018/0196221 A1 | 7/2018 | Sun et al. | |
| 2018/0367725 A1 | 12/2018 | Li | |
| 2019/0068869 A1* | 2/2019 | Kadambala | G03B 13/36 |
| 2019/0253607 A1 | 8/2019 | Chen et al. | |
| 2019/0335065 A1* | 10/2019 | Kim | H04N 23/73 |
| 2020/0076989 A1 | 3/2020 | Kim | |
| 2020/0242788 A1* | 7/2020 | Jacobs | G06T 7/593 |
| 2021/0225018 A1* | 7/2021 | Yu | G06T 7/50 |
| 2021/0337128 A1* | 10/2021 | Cui | H04N 23/61 |

FOREIGN PATENT DOCUMENTS

| | | |
|---|---|---|
| JP | 2020-528700 A | 9/2020 |
| KR | 10-2017-0067634 A | 6/2017 |
| KR | 10-2019-0062102 A | 6/2019 |
| KR | 10-2021-0024071 A | 3/2021 |

OTHER PUBLICATIONS

Canon EOS R vs EOS RP—Five key points analysed (Apr. 2019) (https://mirrorlesscomparison.com/canon-vs-canon/eos-r-vs-eos-rp/).

Updated: Samsung Galaxy S20 Ultra 5G (Exynos) Camera test: Samsung's contender (Oct. 2020) (https://www.dxomark.com/samsung-galaxy-s20-ultra-camera-review/).

Forget the Galaxy S20 Ultra: New Tests Confirm Fundamental Problems (Apr. 2020) (https://www.forbes.com/sites/paulmonckton/2020/04/23/galaxy-s20-ultra-dxomark-tests-problems-zoom-focus/?sh=508b03b072ed).

Why don't cameras have autofocus points in the edges and corners? (Mar. 2014) (https://photo.stackexchange.com/questions/48428/why-dont-cameras-have-autofocus-points-in-the-edges-and-corners).

An Introduction to Dual Pixel Autofocus (DPAF) (Apr. 2017) (https://www.usa.canon.com/internet/portal/us/home/learn/education/topics/article/2018/July/Intro-to-Dual-Pixel-Autofocus-(DPAF)/Intro-to-Dual-Pixel-Autofocus-(DPAF)).

Canon admits the EOS M50 Dual Pixel af doesn't work on 4K mode because of market position (Mar. 2018) (https://www.mirrorlessrumors.com/canon-admits-the-eos-m50-dual-pixel-af-doesnt-work-on-4k-mode-because-of-marketing-reasons/).

Samsung announces the 50MP ISOCELL GN1 image sensor with Dual Pixel autofocus (May 2020) (https://www.xda-developers.com/samsung-50mp-isocell-gn1-image-sensor-dual-pixel-autofocus/).

M50: No DPAF in UHD: Marketing decision or technical limit? (Jul. 2018) (https://www.dpreview.com/forums/thread/4302245#:~:text=The%20M50%20is%20using%20a,other%20brands%20you%20-can't.).

Define handle_af_patterns in the correct header (Feb. 2014) (https://foss.heptapod.net/magic-lantern/magic-lantern/-/blob/branch/unified/src/af_patterns.h).

International Search Report dated Aug. 19, 2022, issued in International Patent Application No. PCT/KR2022/007055.

* cited by examiner

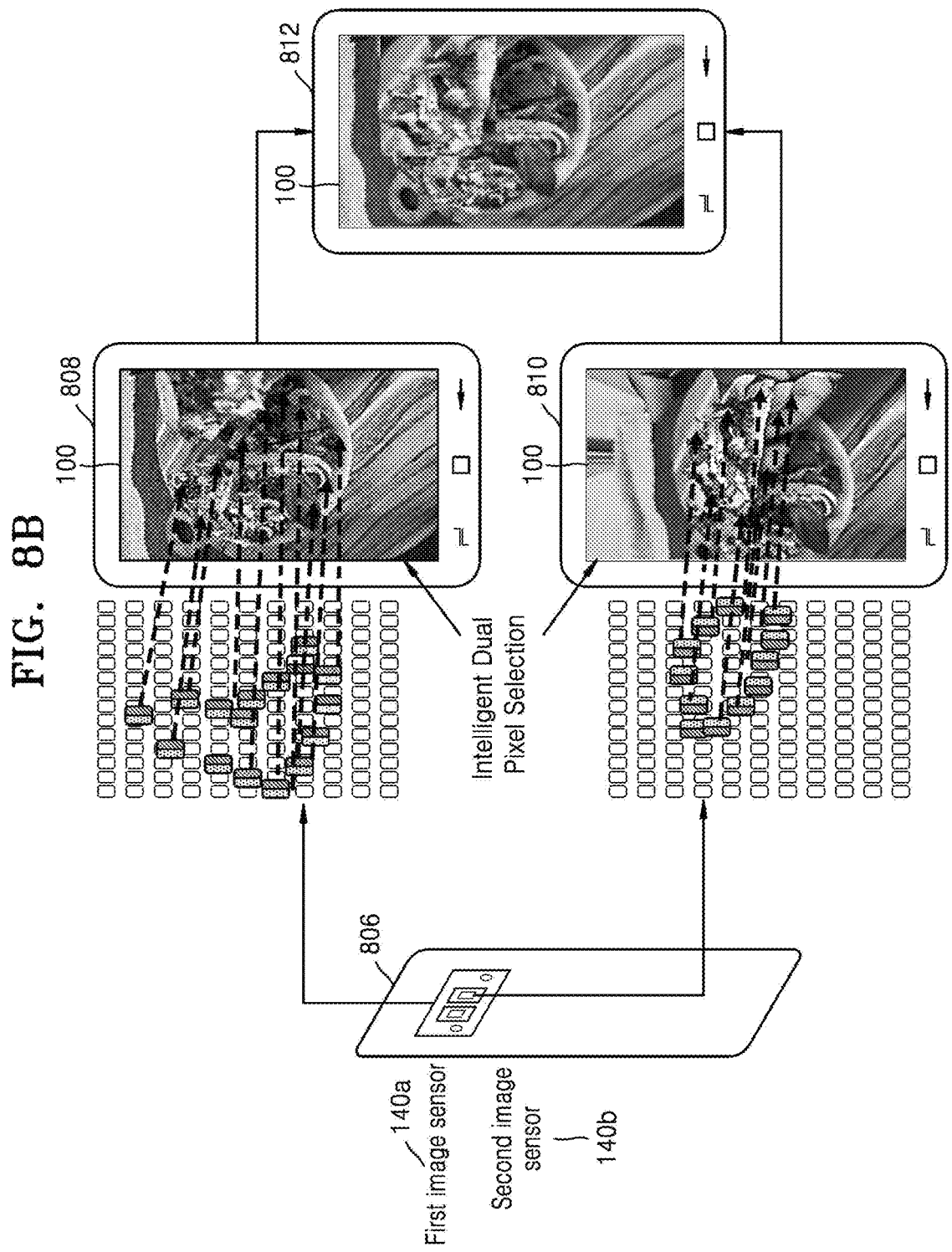

Edges not clear

METHOD AND ELECTRONIC DEVICE FOR AUTO FOCUS OF SCENE

CROSS-REFERENCE TO RELATED APPLICATION(S)

This application is an International Application No. PCT/KR2022/007055 designating the U.S. filed on May 17, 2022, in the Korean Intellectual Property Receiving Office and claiming priority to Indian Patent Application No. 202141038095, filed on Aug. 23, 2021, in the Indian Intellectual Property Office, the disclosure of which is incorporated by reference herein in its entirety.

BACKGROUND

Field

The disclosure relates to image and video processing. More particularly, the disclosure relates to a method and an electronic device for faster and enhanced auto focus of a scene displayed in a viewfinder or from a captured image frame.

Description of Related Art

Dual Pixel autofocus is an increasingly popular smartphone camera feature, particularly at the flagship end of the market. The technology promises much faster focusing for action shots as well as superior focusing in low-light environments. Dual Pixel autofocus is an extension of Phase Detection autofocus (PDAF), featured in smartphone cameras for some years. Essentially, PDAF uses dedicated left-looking and right-looking pixels on the image sensor to calculate whether the image is in focus.

PDAF is the precursor to Dual Pixel autofocus, so understanding how the former works is essential. PDAF is based on the slightly different images created from masked "left-looking and right-looking" photodiodes embedded into the image sensor's pixels. Comparing the phase difference between these pixels is used to calculate the required focus distance. These phase-detection pixels typically make up just around 5-10% of all the image sensor's pixels. Using a larger number of dedicated phase-detection pixel pairs makes PDAF more reliable and accurate. In the move to Dual Pixel AF, every pixel on the sensor is used for PDAF and aids in calculating phase differences and focus. This improves accuracy and speed compared to standard PDAF. Each pixel is split into two photodiodes; one left and right looking. Using micro-lenses placed on-top pixels makes this possible. When taking a photo, the processor analyzes the focus data from each photodiode first before combining the signals to record the full pixel used in the final image.

However, dual pixel technology uses higher processing power. Higher processing power used for all pixels hampers performance and slows down other functions as well as limits value addition to camera. Due to higher processing power for calculation of auto focus using all dual pixels, many advanced optimizations and effects cannot be applied for enhancing the user experience or it may lead to lag or further deterioration of battery. Further, edge objects and objects that are on a depth axis are not easily captured using a single camera. Focusing operations do not utilize information directed to semantic relationships between regions of interest in an image.

Thus, it is desired to at least provide a mechanism for auto focus that is devoid of the above issues.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method of intelligently activate/deactivate dual pixels in order to achieve a fast, reliable and resource effective auto-focus mechanism while having optimization using multiple cameras.

Another aspect of the disclosure is to determine an importance hierarchy to focus on parts which are deemed to be of more importance.

Another aspect of the disclosure is to determine the pixel densities of dual pixels intelligently for calculation of focus according to the ROIs detected in image, user preferences.

Another aspect of the disclosure is to select only strategic dual pixels whose left and right signals are used for focus calculation based on Intelligence criteria and multiple cameras.

Another aspect of the disclosure is to detect at least one region of interest (ROI) in a scene displayed in a viewfinder or from a captured image frame.

Another aspect of the disclosure is to allocate the at least one ROI to at least one first image sensor from the plurality of image sensors to perform a first level of auto focus.

Another aspect of the disclosure is to perform the first level of auto focus on the at least one ROI using the at least one first image sensor to obtain at least one sub ROI of the at least one ROI.

Another aspect of the disclosure is to allocate the at least one sub ROI to at least one second image sensor from the plurality of image sensors to perform a second level of auto focus.

Another aspect of the disclosure is to perform the second level of auto focus on the at least one sub ROI using the at least one second image sensor to obtain at least one focused sub ROI.

Another aspect of the disclosure is to merge focused sub-ROIs and to render a focus transition for the at least one focused sub ROI to the viewfinder or the captured image frame.

Additional aspects will be set forth in part in the description which follows and, in part, will be apparent from the description, or may be learned by practice of the presented embodiments.

In accordance with an aspect of the disclosure, a method for auto focus of a scene by an electronic device is provided. The method includes determining, by the electronic device, at least one region of interest (ROI) in the scene displayed in one of a viewfinder and a captured image frame and determining, by the electronic device, at least one sub ROI in the at least one ROI by performing a first level of auto focus on the at least one ROI using at least one first image sensor of the plurality of image sensors. Further, the method includes determining, by the electronic device, at least one focused sub ROI by performing a second level of auto focus on the at least one sub ROI using at least one second image sensor of the plurality of image sensors; and rendering, by the electronic device, a focus transition for the at least one focused sub ROI to one of the viewfinder and the captured image frame.

In an embodiment, determining, by the electronic device, the at least one sub ROI in the at least one ROI by performing the first level of auto focus on the at least one ROI using the at least one first image sensor of the plurality of image sensors includes determining, by the electronic device, a relative importance factor for each of the at least one ROI and allocating, by the electronic device, the at least one ROI to the at least one first image sensor based on the relative importance factor and a plurality of parameters. Further, the method includes selecting, by the electronic device, dual pixels using a pixel density function to focus on of the at least one ROI for focus calculation and activating, by the electronic device, a set of two photo-diodes of the at least one first image sensor corresponding to the selected dual pixels for performing the first level of auto focus. The method also includes performing, by the electronic device, the first of auto focus corresponding to the selected dual pixels of the at least one ROI using an activated diode; and determining, by the electronic device, the at least one sub ROI in the at least one ROI based on the first level of auto focus performed on the at least one ROI.

In an embodiment, the selected dual pixels are located at boundary of the at least one ROI.

In an embodiment, determining, by the electronic device, the relative importance factor for each of the at least one ROI includes determining, by the electronic device, a semantic relevance of the at least one ROI to the scene and determining, by the electronic device, at least one object in the at least one ROI and a user preference with respect to the determined at least one object. Further, the method includes concatenating, the semantic relevance of the at least one ROI, the at least one object in the at least one ROI and the user preference with respect to the determined at least one object and determining, by the electronic device, the relative importance factor for each of the at least one ROI based on the concatenation.

In an embodiment, allocating, by the electronic device, the at least one ROI to the at least one first image sensor based on the relative importance factor and the plurality of parameters includes determining, by the electronic device, the plurality of parameters associated with the at least one ROI, wherein the plurality of parameters comprises a focal length of an image sensor, a type of the at least one ROI, the importance of the at least one ROI, a line of sight of each image sensor of the electronic device, and a resolution of each image sensor of the electronic device. Further, the method also includes selecting, by the electronic device, the at least one first image sensor from the plurality of image sensors to perform the first level of auto focus based on the plurality of parameters and allocating, by the electronic device, the at least one ROI to the at least one first image sensor from the plurality of image sensors to perform the first level of auto focus.

In an embodiment, determining, by the electronic device, the at least one focused sub ROI by performing the second level of auto focus on the at least one sub ROI using the at least one second image sensor of the plurality of image sensors includes allocating, by the electronic device, the at least one sub ROI to at least one second image sensor from the plurality of image sensors to perform the second level of auto focus and selecting, by the electronic device, dual pixels using a pixel density function to focus on the at least one sub ROI for focus calculation. Further, the method also includes activating, by the electronic device, a set of two photo-diodes of the at least one second image sensor corresponding to the selected dual pixels for performing the second level of auto focus and performing, by the electronic device, the second level of auto focus corresponding to the selected dual pixels of the at least one sub ROI using at least one activated pixel to obtain the at least one focused sub-ROI In an embodiment, the pixel density function is determined as active pixel density function for the at least one focused sub-ROI as a mixture of Gaussians and wherein with each Gaussian is centered at a landmark.

In an embodiment, allocating, by the electronic device, the at least one sub ROI to at least one second image sensor from the plurality of image sensors to perform the second level of auto focus includes segregating, by the electronic device, the at least one ROI into a plurality of sub-ROIs and detecting, by the electronic device, at least one landmark on each of the plurality of sub-ROIs. The method also includes estimating, by the electronic device, an importance factor for each sub-ROI based on the detected at least one landmark on each of the plurality of sub-ROIs and selecting, by the electronic device, the at least one sub-ROI from the plurality of sub-ROIs based on the importance factor and the detected landmarks. Further, the method also includes selecting, by the electronic device, the at least one second image sensor supporting dual pixel density function from the plurality of image sensors; and allocating, by the electronic device, the at least one sub-ROI to the at least one selected second image sensor for performing the second level of auto focus.

In an embodiment, estimating, by the electronic device, the importance factor for each sub-ROI based on the detected at least one landmark on each of the plurality of sub-ROIs includes determining, by the electronic device, a number of ROIs detected in the sub-ROI. The method also includes determining, by the electronic device, a user preference corresponding to the sub-ROI and estimating, by the electronic device, the importance factor for the sub-ROI using the number of ROIs detected in the sub-ROI and the user preference corresponding to the sub-ROI.

In an embodiment, rendering, by the electronic device, the focus transition for the at least one focused sub ROI to one of the viewfinder and the captured image frame includes merging, by the electronic device, the at least one focused sub-ROI obtained from the at least one second image sensor to obtain an optimal sub-ROI. The method also includes determining, by the electronic device, the focus transition for displaying the optimal sub-ROI; and rendering, by the electronic device, the focus transition for the optimal sub-ROI to one of the viewfinder and the captured image.

In an embodiment, the focus transition is determined based on at least one of user preference and a hierarchy important of the at least one ROI, a type of the at least one ROI, and an importance of the at least one ROI.

In accordance with another aspect of the disclosure, an electronic device for auto focus on a scene is provided. The electronic device includes a memory, a processor, a communicator, a plurality of image sensors and a focus optimization controller. The focus optimization controller is configured to determine at least one region of interest (ROI) in the scene displayed in one of a viewfinder and a captured image frame and determine at least one sub ROI in the at least one ROI by performing a first level of auto focus on the at least one ROI using at least one first image sensor of the plurality of image sensors. The focus optimization controller is also configured to determine at least one focused sub ROI by performing a second level of auto focus on the at least one sub ROI using at least one second image sensor of the plurality of image sensors, and render a focus transition for the at least one focused sub ROI to one of the viewfinder and the captured image frame.

Other aspects, advantages, and salient features of the disclosure will become apparent to those skilled in the art from the following detailed description, which, taken in conjunction with the annexed drawings, discloses various embodiments of the disclosure.

In an embodiment, the above electronic device, wherein the focus optimization controller is further configured, when determining the relative importance factor for each of the at least one ROI, to: determine a semantic relevance of the at least one ROI to the scene; determine at least one object in the at least one ROI and a user preference with respect to the determined at least one object; concatenate the semantic relevance of the at least one ROI, the at least one object in the at least one ROI and the user preference with respect to the determined at least one object; and determine the relative importance factor for each of the at least one ROI based on the concatenation.

In an embodiment, the above electronic device, wherein the focus optimization controller is further configured, when determining the relative importance factor for each of the at least one ROI, to: determine a semantic relevance of the at least one ROI to the scene; determine at least one object in the at least one ROI and a user preference with respect to the determined at least one object; concatenate the semantic relevance of the at least one ROI, the at least one object in the at least one ROI and the user preference with respect to the determined at least one object; and determine the relative importance factor for each of the at least one ROI based on the concatenation.

In an embodiment, the above electronic device, wherein the focus optimization controller is further configured, when allocating the at least one ROI to the at least one first image sensor based on the relative importance factor and the plurality of parameters, to: determine the plurality of parameters associated with the at least one ROI, wherein the plurality of parameters comprises a focal length of an image sensor, a type of the at least one ROI, the importance of the at least one ROI, a line of sight of each image sensor of the electronic device, and a resolution of each image sensor of the electronic device; select the at least one first image sensor from the plurality of image sensors to perform the first level of auto focus based on the plurality of parameters; and allocate the at least one ROI to the at least one first image sensor from the plurality of image sensors to perform the first level of auto focus.

In an embodiment, the above electronic device, wherein the focus optimization controller is further configured, when determining the at least one focused sub-ROI by performing the second level of auto focus on the at least one sub-ROI using the at least one second image sensor of the plurality of image sensors, to: allocate the at least one sub-ROI to at least one second image sensor from the plurality of image sensors to perform the second level of auto focus; select dual pixels using a pixel density function to focus on the at least one sub-ROI for focus calculation; activate a set of two photodiodes of the at least one second image sensor corresponding to the selected dual pixels for performing the second level of auto focus; and perform the second level of auto focus corresponding to the selected dual pixels of the at least one sub-ROI using at least one activated pixel to obtain the at least one focused sub-ROI.

In an embodiment, the above electronic device, wherein the pixel density function is determined as an active pixel density function for the at least one focused sub-ROI as a mixture of Gaussians, and wherein with each Gaussian is centered at a landmark.

In an embodiment, the above electronic device, wherein the focus optimization controller is further configured, when allocating the at least one sub-ROI to at least one second image sensor from the plurality of image sensors to perform the second level of auto focus, to: segregate the at least one ROI into a plurality of sub-ROIs; detect at least one landmark on each of the plurality of sub-ROIs; estimate an importance factor for each sub-ROI based on the detected at least one landmark on each of the plurality of sub-ROIs; select the at least one sub-ROI from the plurality of sub-ROIs based on the importance factor and the detected at least one landmark; select the at least one second image sensor supporting dual pixel density function from the plurality of image sensors; and allocate the at least one sub-ROI to the at least one selected second image sensor for performing the second level of auto focus.

In an embodiment, the above electronic device, wherein the focus optimization controller is further configured, when estimating the importance factor for each sub-ROI based on the detected at least one landmark on each of the plurality of sub-ROIs, to: determine a number of ROIs detected in the sub-ROI; determine a user preference corresponding to the sub-ROI; and estimate the importance factor for the sub-ROI using the number of ROIs detected in the sub-ROI and the user preference corresponding to the sub-ROI.

In an embodiment, the above electronic device, wherein the focus optimization controller is further configured, when rendering the focus transition for the at least one focused sub-ROI to one of the viewfinder and the captured image frame, to: merge the at least one focused sub-ROI obtained from the at least one second image sensor to obtain an optimal sub-ROI; determine the focus transition for displaying the optimal sub-ROI; and render the focus transition for the optimal sub-ROI to one of the viewfinder and the captured image.

In an embodiment, the above electronic device, wherein the focus transition is determined based on at least one of a user preference and a hierarchy important of the at least one ROI, a type of the at least one ROI, or an importance of the at least one ROI.

In an embodiment, the above electronic device, wherein the importance factor of each of the ROI is based on user preferences, a global semantic relevance of each ROI to whole image, and a general preference.

In an embodiment, the above electronic device, wherein the focus optimization controller is further configured to assign an image sensor of the plurality of image sensors to each ROI based on properties of the image sensor, an ROI importance, and a line of sight.

In an embodiment, the above electronic device, wherein the focus optimization controller is further configured to select pixels on a boundary of an ROI based on the pixel density function.

According to another aspect of one or more embodiments, there is provided a computer-readable storage medium, having a computer program stored thereon that performs, when executed by a processor, the above method.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 8A and 8B are examples illustrating multiple ROIs with different Z orders being captured by an electronic device, according to an embodiment of the disclosure;

Throughout the drawings, it should be noted that like reference numbers are used to depict the same or similar elements, features, and structures.

DETAILED DESCRIPTION

Figure 1:
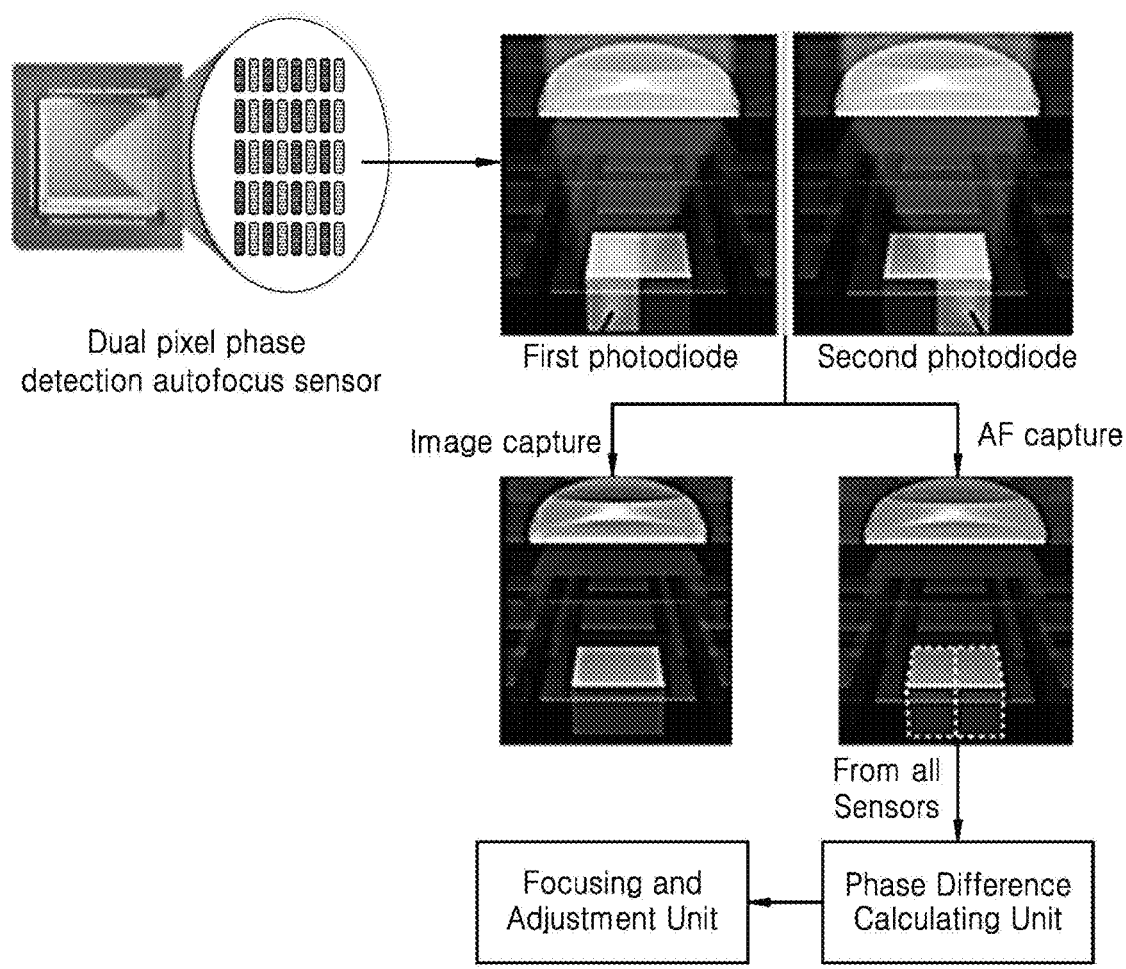
FIG. 1 illustrates traditional phase detection autofocus (PDAF), according to the related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, embodiments herein disclose a method for auto focus of a scene by an electronic device. The method includes determining, by the electronic device, at least one region of interest (ROI) in the scene displayed in one of a viewfinder and a captured image frame and determining, by the electronic device, at least one sub ROI in the at least one ROI by performing a first level of auto focus on the at least one ROI using at least one first image sensor of the plurality of image sensors. Further, the method includes determining, by the electronic device, at least one focused sub ROI by performing a second level of auto focus on the at least one sub ROI using at least one second image sensor of the plurality of image sensors; and rendering, by the electronic device, a focus transition for the at least one focused sub ROI to one of the viewfinder and the captured image frame.

Accordingly, embodiments herein disclose electronic device for auto focus on a scene. The electronic device includes a memory, a processor, a communicator, a plurality of image sensors and a focus optimization controller. The focus optimization controller is configured to determine at least one region of interest (ROI) in the scene displayed in one of a viewfinder and a captured image frame and determine at least one sub ROI in the at least one ROI by performing a first level of auto focus on the at least one ROI using at least one first image sensor of the plurality of image sensors. The focus optimization controller is also configured to determine at least one focused sub ROI by performing a second level of auto focus on the at least one sub ROI using at least one second image sensor of the plurality of image sensors, and render a focus transition for the at least one focused sub ROI to one of the viewfinder and the captured image frame.

Conventional methods and systems, recognize objects to be focused and obtain focus statically irrespective of their relevance and importance to the scene. Unlike to the conventional methods and systems, the proposed method understands the scene and the relevance and importance of the objects to the scene and allots processing resources accordingly.

Unlike to the conventional methods and systems, the proposed method optimizes a number of pixels whose data is processed for phase detection by finding minimalistic activated pixel distribution incrementally to cross focus quality threshold.

Unlike to the conventional methods and systems, the proposed method provides solution for focusing objects that are at edges of a line of sight by obtaining focal information from other cameras or by inter camera phase detection.

Unlike to the conventional methods and systems, the proposed method focuses on sub ROIs based on an importance score assigned and works by selecting multiple cameras. The proposed method uses a combination of user behavior and intelligence software for performing dual pixel activation for focus. Further, the proposed method intelligently activate/deactivate dual pixels in order to detect depth while having optimization using multiple cameras. The proposed method uses an importance hierarchy to focus on parts which are deemed to be of more importance.

The proposed method provides the following advantages:

1. Power saving: Activation of dual pixel intelligently will decrease usage of all dual pixels thereby decreasing cpu processing and therefore power consumption. Processing will be saved by only using boundary pixels for focus and through Gaussian mixture models for focus so as to optimize the focus delivery and save processing power. The saved processing can be used for other purposes.

2. Faster Focus: Due to reduction in processing needed, faster focusing is achieved.

3. User personalization: A hierarchy based focus mechanism will provide focus based on user preference increasing utility for the user. Content output rendering according to the user will relieve user of the effort of creating his preferred content. For example, a gif creation will be done automatically according to the user, if the user prefers viewing gif content.

4. Edge focus improvement: Current dual pixel auto focus mechanism loses focus on edges. Proposed solution will use focus information from other cameras in the multi camera apparatus to focus on edges thus solving the inherent problems with dual pixel auto focus.

5. Sub ROI focus: Increase in the overall clarity of the image by focusing on sub ROIs using the multi camera apparatus as opposed to the static focus on the complete image.

FIG. 1 illustrates traditional phase detection autofocus (PDAF), according to the related art.

Conventionally, the Phase detection sensor comes separately with dedicated focus pixels (5% of total pixels) which consist of single photo-diode. The PDAF uses phase detection technique on two pixel data (left-looking and right-looking pixels) to obtain phase difference which will be minimized. The left and right individual pixels are not arranged adjacently hence the phase difference being calculated is not very accurate. The pixels used for autofocus are static i.e. predefined (5%) and is less accurate and slow. The individual pixels are able to capture limited image information and hence low light imaging is not good. Accurate focus achievement in all scenarios is not possible due to very limited number of dedicated pixels being used for auto focus.

Conventionally, when a scene is to be captured by the electronic device using dual pixel phase detection auto-focus sensor, each pixel in a dual pixel array used to capture an image of a scene includes a first photodiode and a second photodiode. Further, signals from the first photodiode and the second photodiode associated with each pixel in the dual pixel array is sent to a phase difference calculating unit. Based on the output from the phase difference calculating unit, a focusing and adjustment unit determines auto-focus characteristics for the image. However, the process requires high processing power which in-turn consumes high battery power. Also, the processing is time-consuming with low intelligence used, leading to a bad user experience.

Referring now to the drawings, and more particularly to FIGS. 2 through 12, where similar reference characters denote corresponding features consistently throughout the figures, there are shown preferred embodiments.

Figure 2:
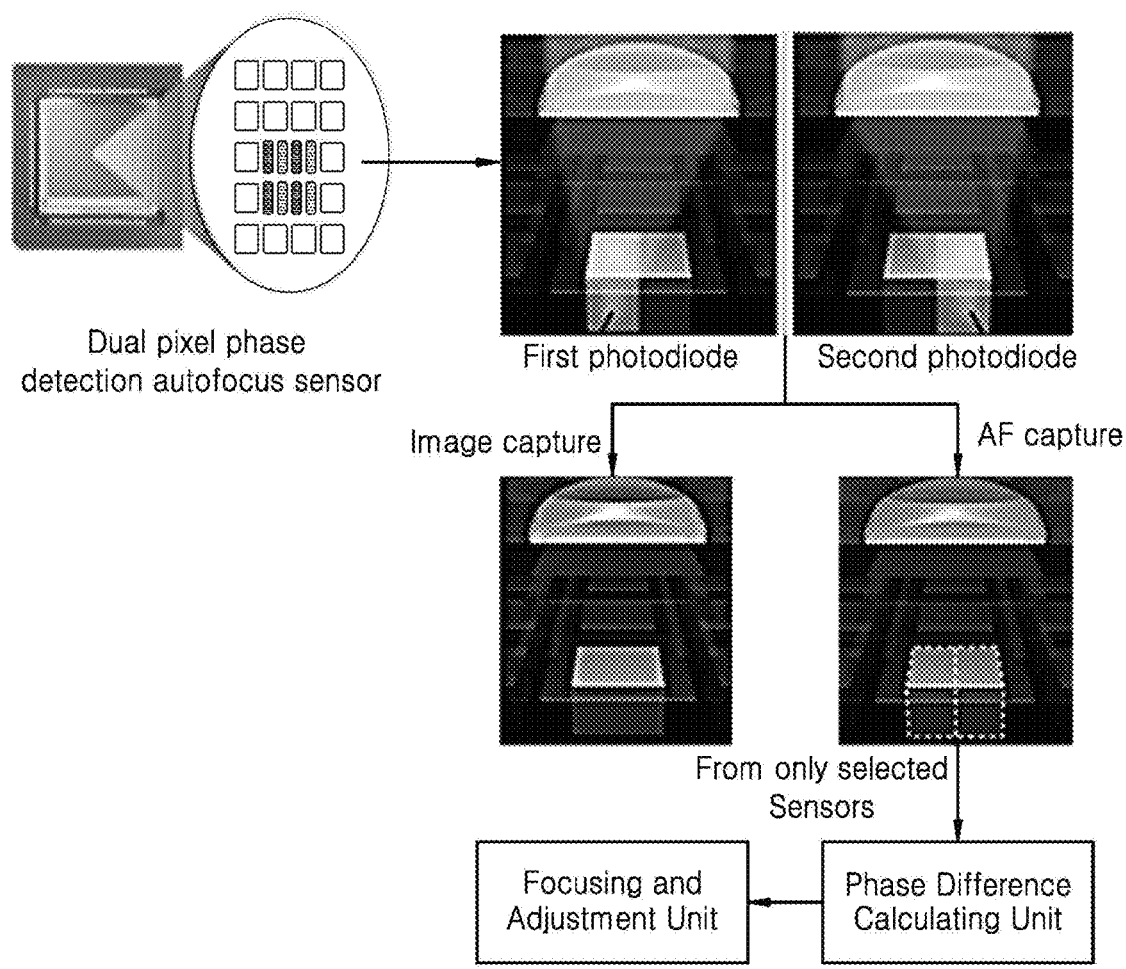
FIG. 2 illustrates optimized dual pixel autofocus (DPAF), according to an embodiment of the disclosure.

FIG. 2 illustrates optimized dual pixel autofocus (DPAF), according to an embodiment of the disclosure.

The DPAF includes an imaging sensor which is composed of image pixels with each pixel containing two photo-dioides (Dual Pixel). The DPAF handles autofocus. The DPAF uses phase detection technique on single pixel data (left-photodiode and right-photodiode) to obtain phase difference which will be minimized. The left and right photodiodes are adjacent and are able to capture the focus info with higher accuracy. The pixels used for autofocus are dynamically selected for each ROI based on intelligent features like ROI shape, importance, texture details, and the like. The individual pixels have two photo sites and hence are capable of handling low light imaging efficiently. Accurate focus is possible because the number of focus points is higher and intelligently decided for maximum accuracy.

The proposed method for auto-focus selects only strategic pixels whose left and right signals are used for focus calculation based on intelligence criteria and multiple cameras.

Figure 3:
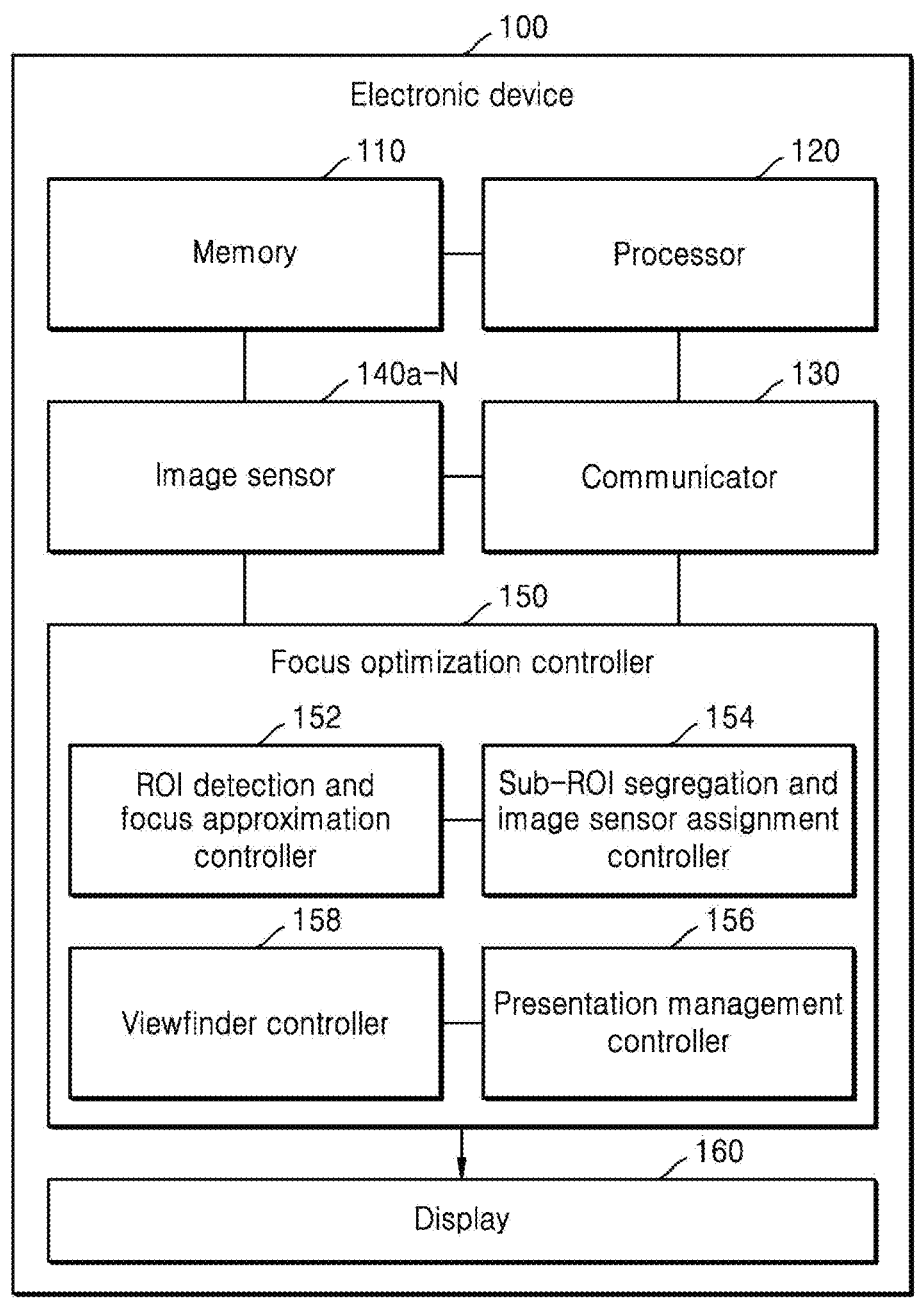
FIG. 3 illustrates a block diagram of an electronic device for auto focus on a scene, according to an embodiment of the disclosure.

FIG. 3 illustrates a block diagram of an electronic device for auto focus on a scene, according to an embodiment of the disclosure. The electronic device may be, but is not limited to a laptop, a palmtop, a desktop, a mobile phone, a smart phone, Personal Digital Assistant (PDA), a tablet, a wearable device, an Internet of Things (IoT) device, a virtual reality device, a foldable device, a flexible device or an immersive system.

Referring to FIG. 3, the electronic device 100 may include a memory 110, a processor 120, a communicator 130, multiple image sensors 140a-N, an image optimization controller 150 and a display 160.

The memory 110 is configured to store instructions to be executed by the processor 120. The memory 110 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 110 may, in some examples, be considered a non-transitory storage medium. The term "non-transitory" may indicate that the storage medium is not embodied in a carrier wave or a propagated signal. However, the term "non-transitory" should not be interpreted that the memory 110 is non-movable. In some examples, the memory 110 can be configured to store larger amounts of information. In certain examples, a non-transitory storage medium may store data that can, over time, change (e.g., in Random Access Memory (RAM) or cache).

The processor 120 communicates with the memory 110, the communicator 130, the multiple image sensors 140a-N, the focus optimization controller 150, and the display 160. The processor 120 is configured to execute instructions stored in the memory 110 and to perform various processes. The processor may include one or a plurality of processors, may be a general purpose processor, such as a central processing unit (CPU), an application processor (AP), and the like, a graphics-only processing unit such as a graphics processing unit (GPU), a visual processing unit (VPU), and/or an Artificial intelligence (AI) dedicated processor such as a neural processing unit (NPU).

The communicator 130 may include an electronic circuit specific to a standard that enables wired or wireless communication. The communicator 130 is configured to communicate internally between internal hardware components of the electronic device 100 and with external devices via one or more networks.

The multiple image sensors 140a-N are configured to receive a scene which is displayed in a viewfinder or from a captured image frame. The multiple image sensors 140a-N include at least one lens 142 of FIG. 4A that captures the scene based on the light coming from the scene and focuses light onto the dual pixel sensor array. Pixels in the first image sensor 140a may include photosensitive elements that convert the light into digital data and capture the image frame of the scene. A typical image sensor may, for example, have millions of pixels (e.g., megapixels) and is configured to capture a series of image frames of the scene based on a single click input from a user. Each of the multiple image sensors 140a-N comprises different focal lengths. The image may be for example still images capturing the scene, video comprising multiple images, or a combination thereof.

In an embodiment, the focus optimization controller 150 may include ROI detection and focus approximation controller 152, sub-ROI segregation and image sensor assignment controller 154, a presentation management controller 156 and a viewfinder controller 158. The focus optimization controller 150 is implemented by processing circuitry such as logic gates, integrated circuits, microprocessors, microcontrollers, memory circuits, passive electronic components, active electronic components, optical components, hardwired circuits, and the like, and may optionally be driven by firmware. The circuits may, for example, be embodied in one or more semiconductors.

The ROI detection and focus approximation controller 152 is configured to detect multiple ROI in the scene. At least one ROI in the scene is detected to perform a first level of auto focus. The sub-ROI segregation and image sensor assignment controller 154 is configured to allocate the ROI to the first image sensor 140a of the plurality of image sensors 140a-N to perform the first level of auto focus. Further, the sub-ROI segregation and image sensor assignment controller 154 is also configured to perform the first level of auto focus on the at least one ROI using the at least one first image sensor to obtain at least one sub ROI of the at least one ROI and allocate at least one sub ROI to at least one second image sensor from the plurality of image sensors to perform a second level of auto focus. Further, the sub-ROI segregation and image sensor assignment controller 154 is configured to perform the second level of auto focus on the at least one sub ROI using the at least one second image sensor to obtain at least one focused sub ROI and render a focus transition for the at least one focused sub ROI to the viewfinder or the captured image frame.

The presentation management controller 156 is configured to merge auto focused output from the at least one image sensor 140a-N and a viewfinder controller 158 configured for displaying the auto focused output on the display 160. The auto focused content may be provided in a form based on user preferences such as a video or GIF then the auto focused content is provided as a sequence of the focused image. In case the user prefers images then a composited completely focused image is provided. Each of the individual components within the focus optimization controller 150 is explained in detail from FIG. 4A to FIG. 6B.

At least one of the plurality of modules/components of the focus optimization controller 150 may be implemented through an AI model. A function associated with the AI model may be performed through memory 110 and the processor 120. The one or a plurality of processors controls the processing of the input data in accordance with a predefined operating rule or the AI model stored in the non-volatile memory and the volatile memory. The predefined operating rule or artificial intelligence model is provided through training or learning.

Being provided through learning means that, by applying a learning process to a plurality of learning data, a predefined operating rule or AI model of a desired characteristic is produced. The learning may be performed in a device itself in which AI according to an embodiment is performed, and/or may be implemented through a separate server/system.

The AI model may consist of a plurality of neural network layers. Each layer has a plurality of weight values and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning process is a method for training a predetermined target device (e.g., a robot) using a plurality of learning data to cause, allow, or control the target device to make a determination or prediction. Examples of learning processes include, but are not limited to, supervised learning, unsupervised learning, semi-supervised learning, or reinforcement learning.

The display 160 is configured to display the auto-focused image on a screen of the electronic device 100. The display 160 is capable of receiving inputs and is made of one of liquid crystal display (LCD), light emitting diode (LED), organic light-emitting diode OLED, and the like. The display 160 is also configured to display suggestions of a combination of ROIs of the multiple ROIs which the user may want to focus on.

Although FIG. 3 shows various hardware components of the electronic device 100, it is to be understood that other embodiments are not limited thereon. In other embodiments, the electronic device 100 may include less or more components. Further, the labels or names of the components are used only for illustrative purpose and does not limit the scope of the disclosure. One or more components can be combined together to perform same or substantially similar function to rectify the image by removing the motion characteristic in the image.

Figure 4A:
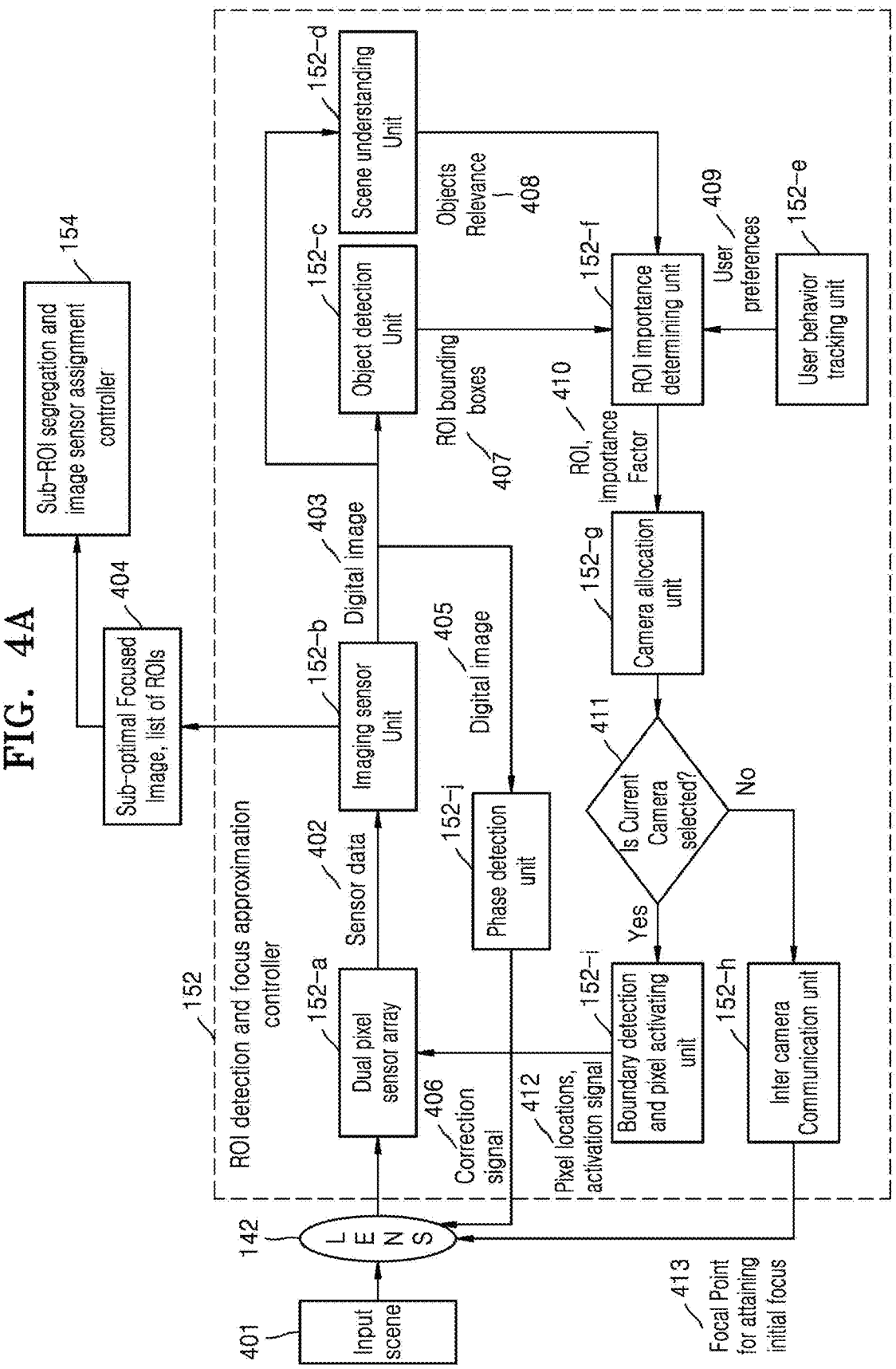
FIG. 4A illustrates various functions performed by a ROI detection and focus approximation controller, according to an embodiment of the disclosure.

FIG. 4A illustrates various functions performed by the ROI detection and focus approximation controller, according to an embodiment of the disclosure.

Referring to the FIG. 4A, at operation 401, consider that a lens 142 of the image sensor 140 captures the input image which leads to photons from the scene falling on a Dual pixel sensor array 152-a. At operation 402, a sensor signal generated by the Dual pixel sensor array 152-a, is sent to imaging sensor unit 152-b which generates a digital image at operation 403. Further, at operation 404 the sub-optimal focused image and list of ROIs are sent to the sub-ROI segregation and image sensor assignment controller 154.

At operation 405, the digital image is also sent to a phase detection unit 152-j by the imaging sensor unit 152-b. At operation 406, the phase detection unit 152-j determines a correction signal and sends the correction signal to the lens 142 to capture the image with a corrected phase.

At operation 407, the digital image is sent to an object detection unit 152-c which determines the ROI bounding boxes of the objects in the image. At operation 408, the digital image is also sent to a scene understanding unit 152-d which studies the scene and identifies objects of relevance in the digital image.

A ROI importance determining unit 152-f receives the ROI bounding boxes of the objects in the image, the objects of relevance in the digital image and user preferences of objects to be captured (determined at operation 409 by an user behavior tracking unit 152-e) as inputs. Further, at operation 410, the ROI importance determining unit 152-f determines a ROI importance factor based on the inputs and sends the same to a camera allocation unit 152-g. The ROI importance determining unit 152-f determines the relative importance factor of each of the ROI based on user preferences (typical scenes user might be interested in) and global semantic relevance of each ROI to whole image and general preference. In the AI Architecture, a CNN is used for outputting importance score for each bounding box.

At operation 411, the camera allocation unit 152-g determines whether a current camera is selected. The camera allocation unit 152-g selects the camera for attaining initial focus based on positions with respect to primary camera, specifications, line of sight. In AI Architecture: C-class multi class classification neural network, C=no of cameras.

In response to determining that the current camera is selected, a boundary detection and pixel activating unit 152-i at operation 412, sends pixel locations of the pixels to be activated along with an activation signal to the dual pixel sensor array 152-a. The boundary detection and pixel activating unit 152-i detects the boundaries of one or more ROIs and activates them based on pixel density allotted to one or more ROIs according to the importance factor, for achieving focus. i.e. the pixels which are utilized in phase detection.

In response to determining that the current camera is not selected, at operation 413 an inter camera communication unit 152-h sends a focal point for attaining initial focus to the lens 142. Therefore, unlike to the conventional methods and systems, the proposed method intelligently determines the objects of importance and actives selected pixels of the determined objects of importance. As a result, the electronic device 100 saves a large amount of processing resources and power which may be utilized for other applications.

Figure 4B:
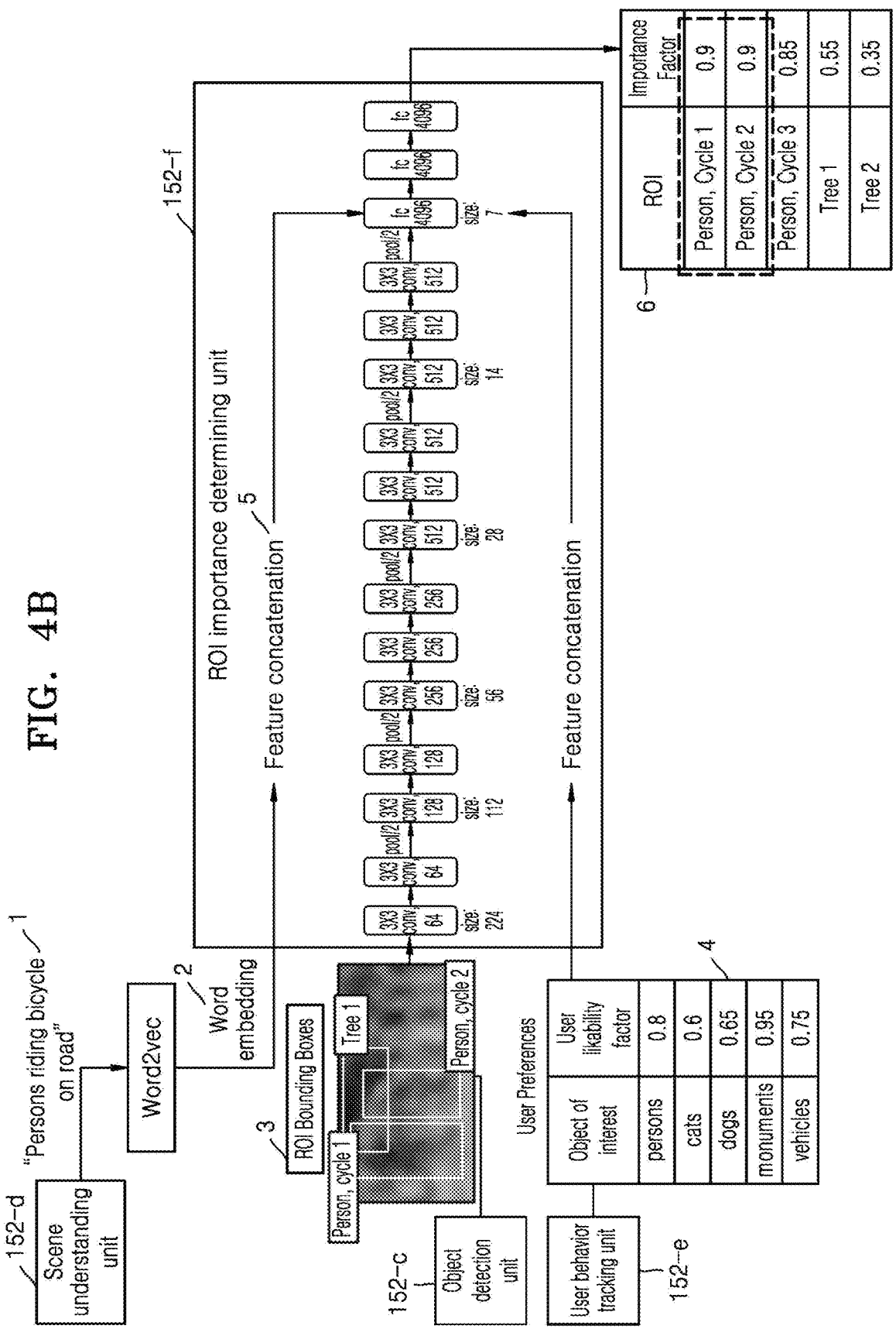
FIG. 4B illustrates a method for determination of ROI importance by a ROI importance determining unit, according to an embodiment of the disclosure.

FIG. 4B illustrates a method for determination of ROI importance by an ROI importance determining unit, according to an embodiment of the disclosure.

Referring to the FIG. 4B, the ROI importance determining unit 152-f is configured to determine the relative importance factor of each ROI based on user preferences and global semantic relevance of each ROI to whole image and general preference.

Consider that at operation 1, the scene understanding unit 152-d determines that the scene comprises "Persons riding bicycle on road" and at operation 2 the Word2vec represents the words in vector forms and feeds the same to the ROI importance determining unit 152-f. At operation 3, the ROI importance determining unit 152-f receives the ROI boundary boxes from the image determined by the object detection unit 152-c. At operation 4, the ROI importance determining unit 152-f also receives the user preferences which typical include the scenes that the user might be interested in form the user behavior tracking unit 152-e. Further, at operation 5, the ROI importance determining unit 152-f which is a Deep Convolutional Neural Network (DCNN) concatenates the multiple inputs and determines the importance factor for each of the ROI, which is presented in the table at operation 6. Therefore, from the table at operation 6, the ROIs enclosing important objects get high importance factor.

Figure 4C:
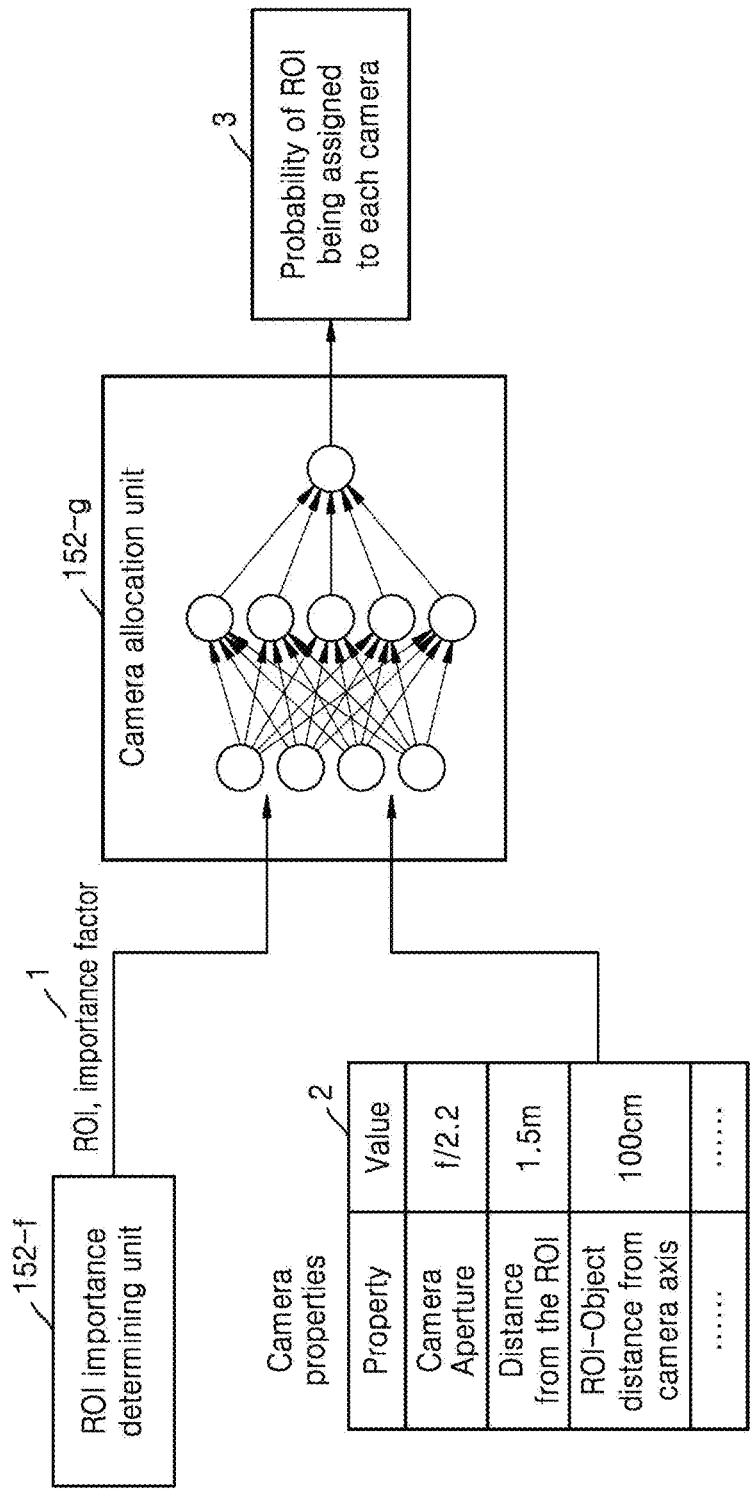
FIG. 4C illustrates functions of a camera allocation unit, according to an embodiment of the disclosure.

FIG. 4C illustrates functions of a camera allocation unit, according to an embodiment of the disclosure.

Referring to the FIG. 4C, the camera allocation unit 152-g assigns a camera to each ROI based on the camera properties, ROI importance, line of sight, and the like. At operation 1, the camera allocation unit 152-g receives the importance factor for each of the ROI determined by the ROI importance determining unit 152-f and at operation 2, receives the various camera properties. The camera allocation unit 152-g is a Feed Forward Neural Network (FFNN). At operation 3, the camera allocation unit 152-*g* determines the probability of each of the ROI being assigned to the camera. Further, the camera allocation unit 152-*g* determines the probability of each of the ROI being assigned to each of the image sensors 140*a*-N of the electronic device 100 and the camera obtaining highest probability will be selected.

Figure 4D:
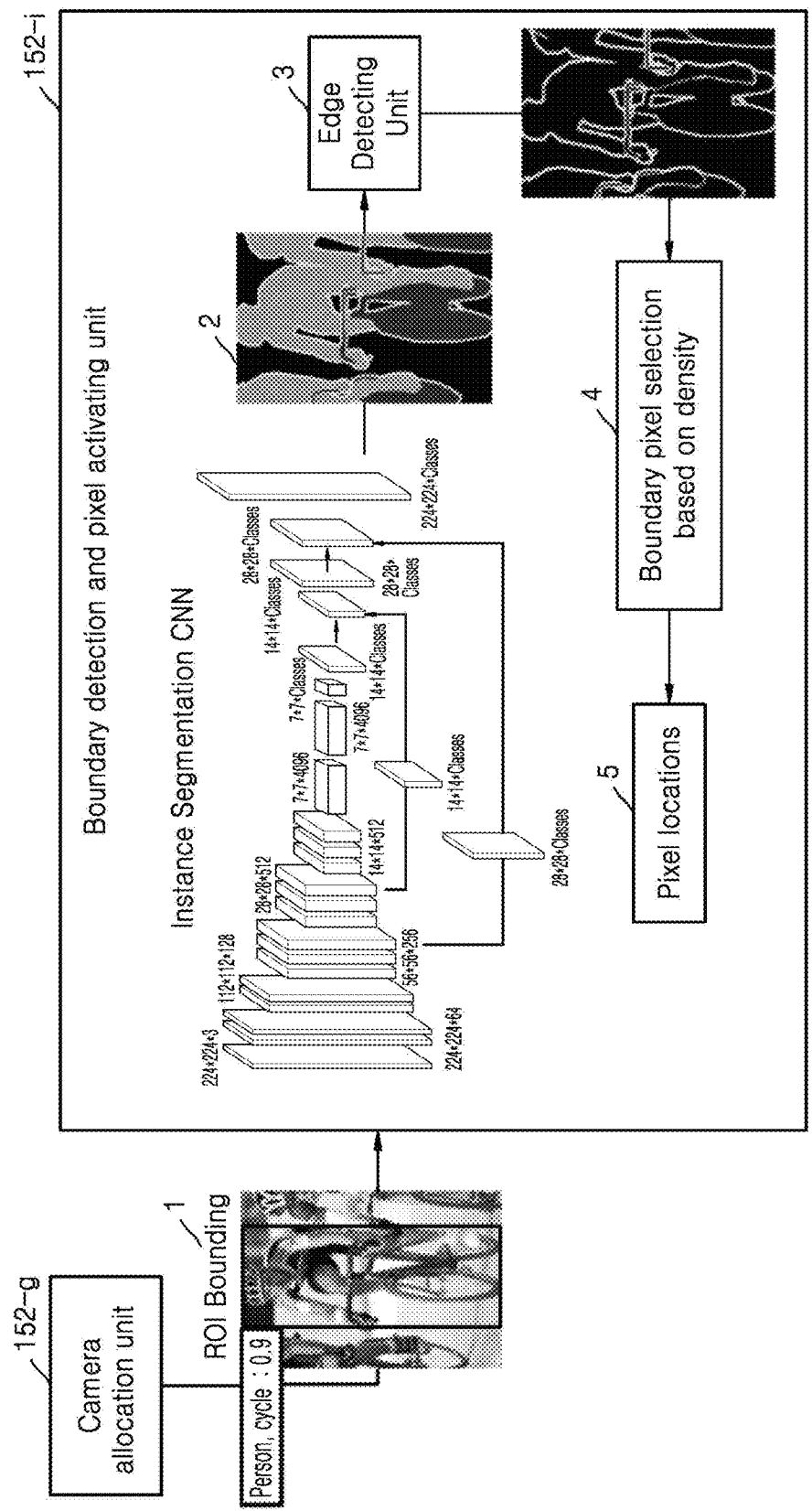
FIG. 4D illustrates functions of a boundary detection and pixel activating unit, according to an embodiment of the disclosure.

FIG. 4D illustrates functions of the boundary detection and pixel activating unit, according to an embodiment of the disclosure.

Referring to the FIG. 4D, the boundary detection and pixel activating unit 152-*i* detects the boundaries of one or more ROIs and activates them based on pixel density allotted to one or more ROIs according to the importance factor, for achieving focus. i.e. the pixels which are utilized in phase detection.

At operation 1, the boundary detection and pixel activating unit 152-*i* receives the bounding boxes of each of the ROI from the camera allocation unit 152-*g*. At operation 2, an instance segmentation CNN of the boundary detection and pixel activating unit 152-*i* segments the ROIs. At operation 3, an edge detection unit of the boundary detection and pixel activating unit 152-*i* detects boundaries of the objects in segmentation mappings. At operation 4, the boundary detection and pixel activating unit 152-*i* selects pixels on boundaries based on pixel density. More pixels will be selected for boundaries with more curvature. Once the pixels are selected, at operation 5 the boundary detection and pixel activating unit 152-*i* identifies the location of each of the selected pixels.

Figure 4E:
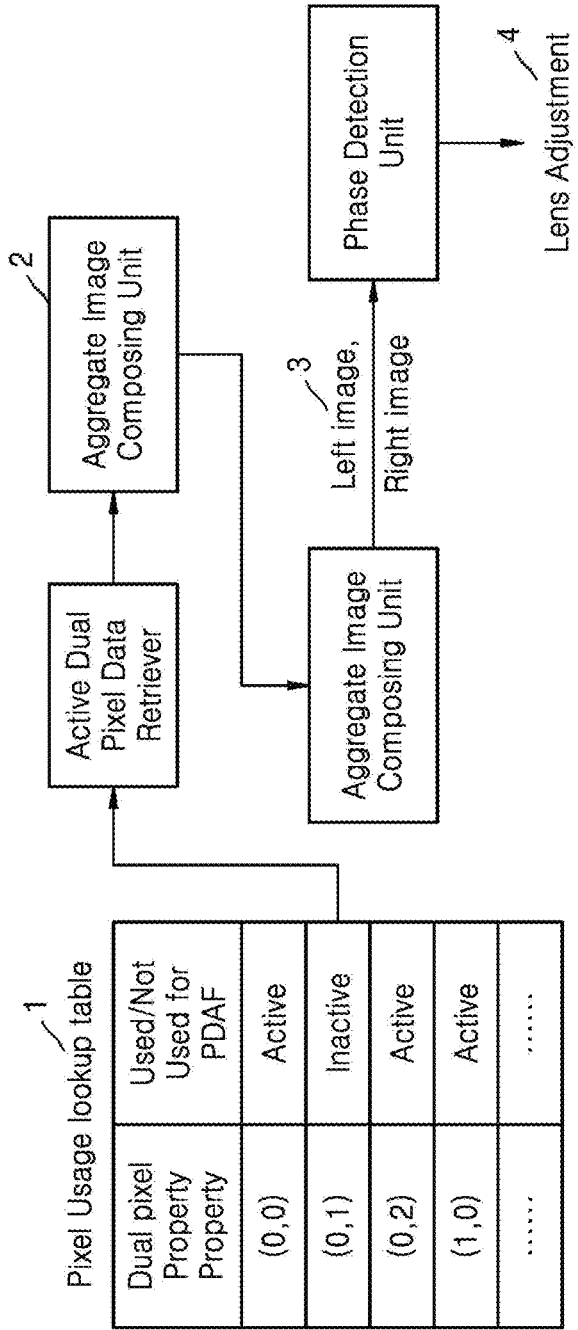
FIG. 4E illustrates a method for controlling dual pixels array based on a static pixel usage table, according to the related art.

FIG. 4E illustrates a method for controlling a dual pixels array based on a static pixel usage table, according to the related art.

Referring to the FIG. 4E, at operation 1 a pixel usage lookup table is provided to an active dual pixel data retriever. The pixel usage lookup table is a static lookup table with predefined pixels which are used for AF irrespective of the content of the image. Further, the active dual pixel data retriever sends the information of the active dual pixel data from the pixel usage lookup table to an aggregate image composing unit which is followed by an aggregate image compositing unit. At operation 3, the aggregate image compositing unit provides a left image and a right image with the predefined pixels which are used for AF to the phase detection unit. At operation 4, the phase detection unit determines a difference in phase between the right image and the left image and corrects the lens 142. However, the pixel usage lookup table is static with predefined pixels and does not take into consideration the ROI or importance of the ROI in the image. Hence, the static approach may miss out on important ROIs in the image and provide focus to unimportant contents.

Figure 4F:
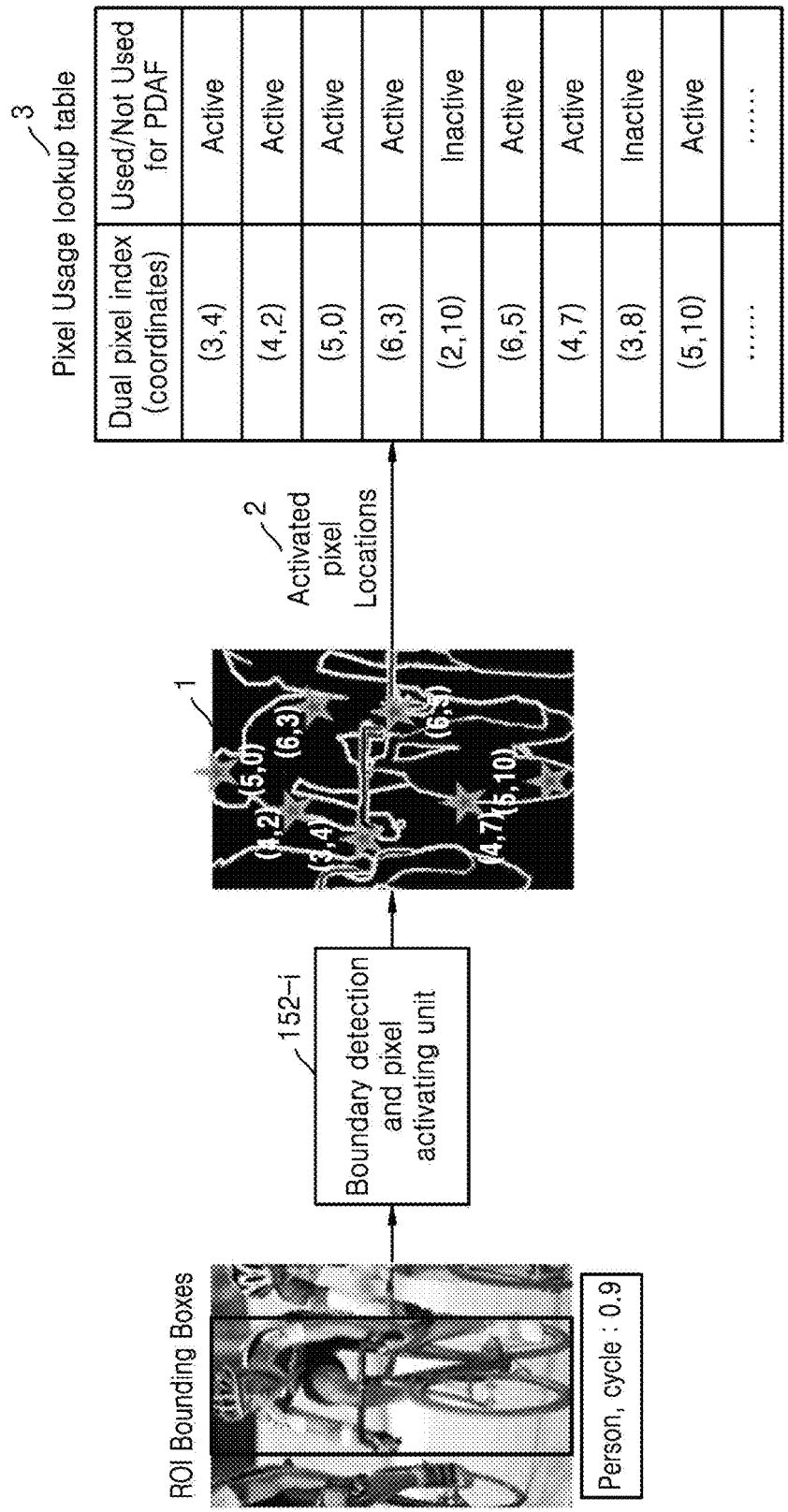
FIG. 4F illustrates a method for dynamically controlling a dual pixels array, according to an embodiment of the disclosure.

FIG. 4F illustrates a method for dynamically controlling a dual pixels array, according to an embodiment of the disclosure.

Referring to the FIG. 4F in conjunction with the FIG. 4E, unlike to the conventional methods and systems for determining the active pixels, in the proposed method the boundary detection and pixel activating unit 152-*i* intelligently determines the boundary of the objects in the ROI boundary boxes. For example, the ROI boundary box includes the person on a cycle. The boundary detection and pixel activating unit 152-*i* detects the boundary of the person on the cycle and identifies the locations at which the pixels needs to be activated (shown with star markings at operation 1). Further, at operation 2, the activated pixel locations are formulated together in the pixel usage lookup table (operation 3). Therefore, in the proposed method the active pixel locations are determined dynamically based on the content in the ROI, shape of the content, importance of the content, etc.

Figure 5A:
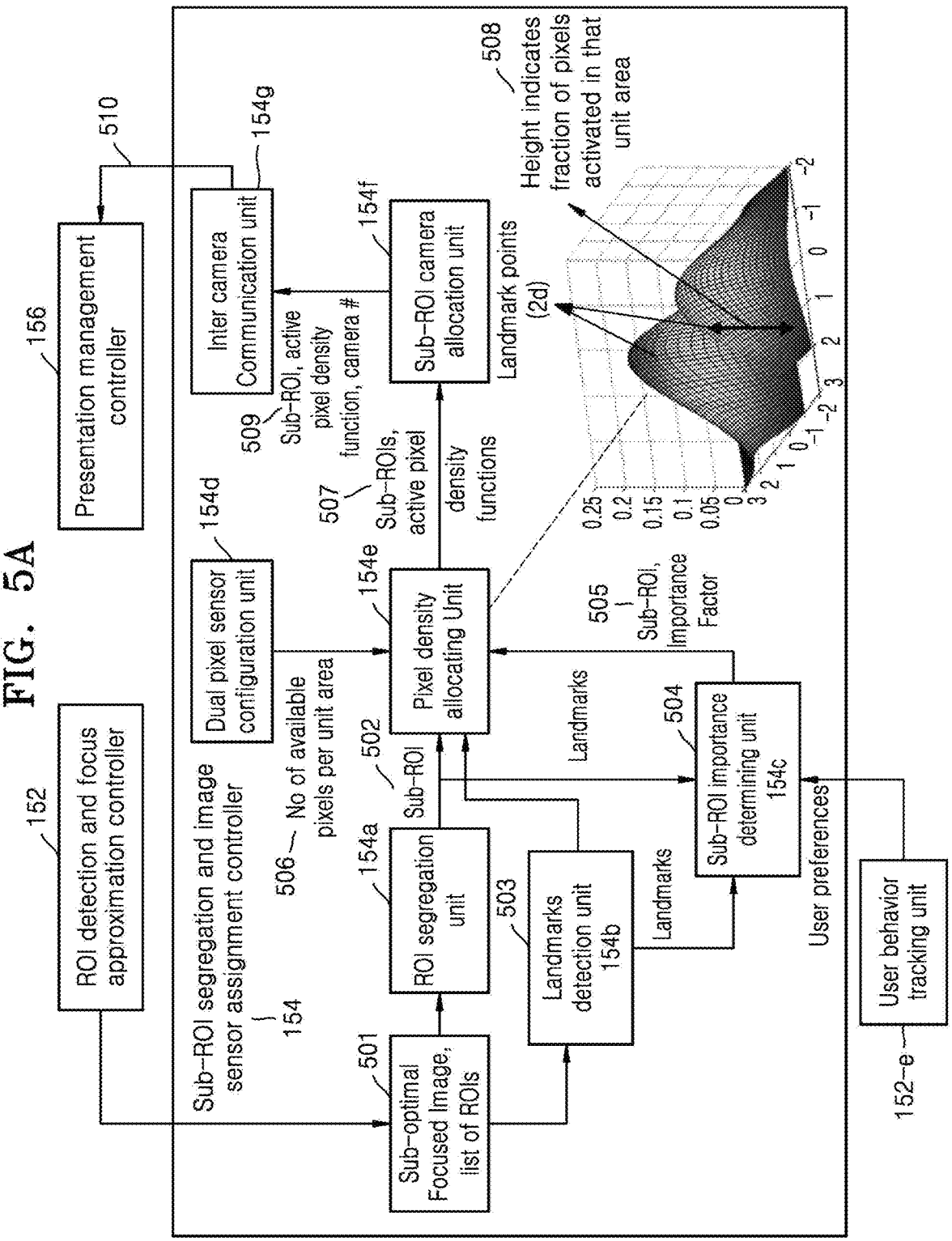
FIG. 5A illustrates various functions performed by a sub-ROI segregation and image sensor assignment controller, according to an embodiment of the disclosure.

FIG. 5A illustrates various functions performed by a sub-ROI segregation and image sensor assignment controller, according to an embodiment of the disclosure.

Referring to the FIG. 5A, at operation 501, the sub-optimal focused image and list of ROIs received from the ROI detection and focus approximation controller 152 is sent to a ROI segregation unit 154*a* and a landmarks detection unit 154*b*. At operation 502, the ROI segregation unit 154*a* determines the sub-ROI in the image and shares the same with a pixel density allocating unit 154*e*.

At operation 503, the landmarks detection unit 154*b* determines landmarks in the image and shares the same with sub-ROI importance determining unit 154*c*. At operation 504, the sub-ROI importance determining unit 154*c* receives the landmarks, the user preferences from the user behavior tracking unit 152-*e* and the landmarks from the sub-ROI. At operation 505, the sub-ROI importance determining unit 154*c* determines the sub-ROI and the importance factor, and shares the same with the pixel density allocating unit 154*e*. At operation 506, the pixel density allocating unit 154*e* also receives the number of available pixels per unit area from the dual pixel sensor configuration 154*d*. At operation 507, the pixel density allocating unit 154*e* determines sub-ROIs and active pixel density functions and sends it to sub-ROI camera allocation unit 154*f*. Operation 508 provides a figure where height indicates fraction of pixels activated in that unit area. At operation 509, the sub-ROI camera allocation unit 154*f* sends the data associated with the camera of the multiple cameras, which needs to be allocated for each of the sub-ROI with active pixel density function. The inter camera communication unit 154*g* is configured to communicate between the cameras based on the outputs received from the sub-ROI camera allocation unit 154*f* and then send instructions to the presentation management controller 156.

Figure 5B:
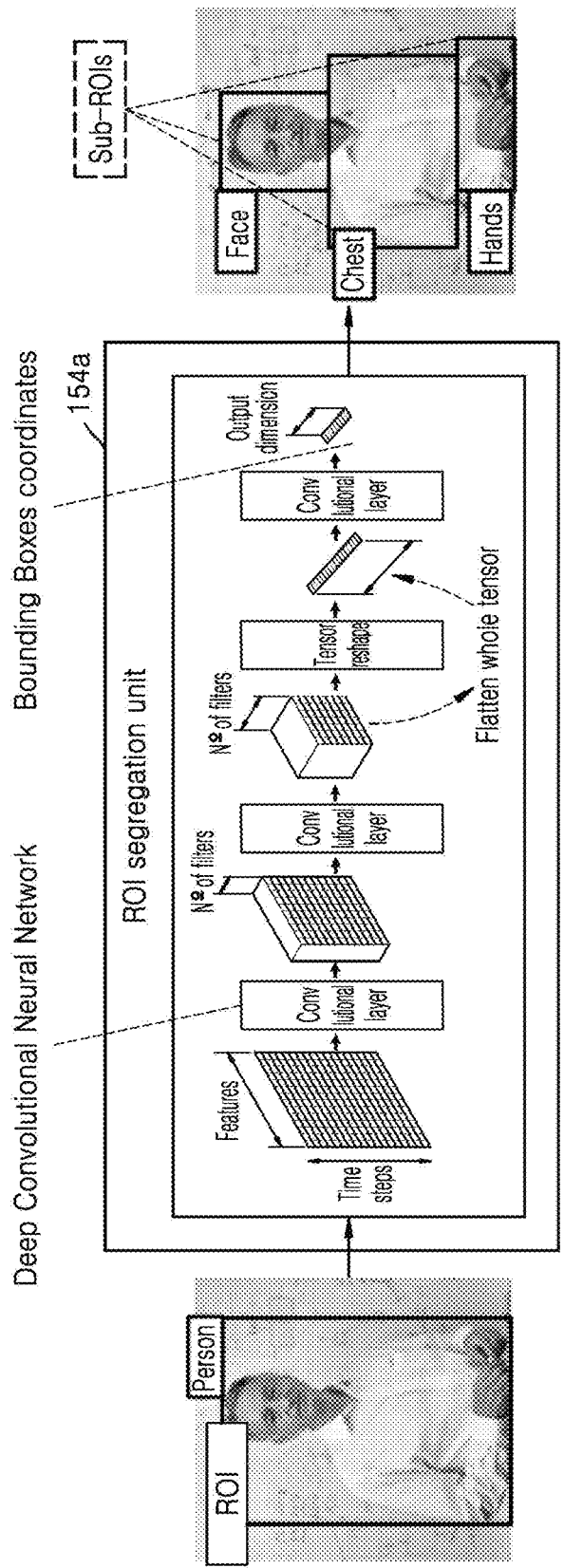
FIG. 5B illustrates functioning of the ROI segregation unit, according to an embodiment of the disclosure.

FIG. 5B illustrates functioning of an ROI segregation unit, according to an embodiment of the disclosure.

Referring to the FIG. 5B, consider an image comprising a person facing camera upright. Hence, the ROI is the person in the image. The image with the ROI determined is provided to the ROI segregation unit 154*a* which is a Deep Convolutional Neural Network. The ROI segregation unit 154*a* segregates each ROI into sub regions having semantically interpretable components called (Sub-ROIs) by analyzing the ROI image. Therefore, the output of the ROI segregation unit 154*a* is that the ROI of the person is segmented into three sub-ROIs which include face of the person, chest of the person and hands of the person in the image.

Figure 5C:
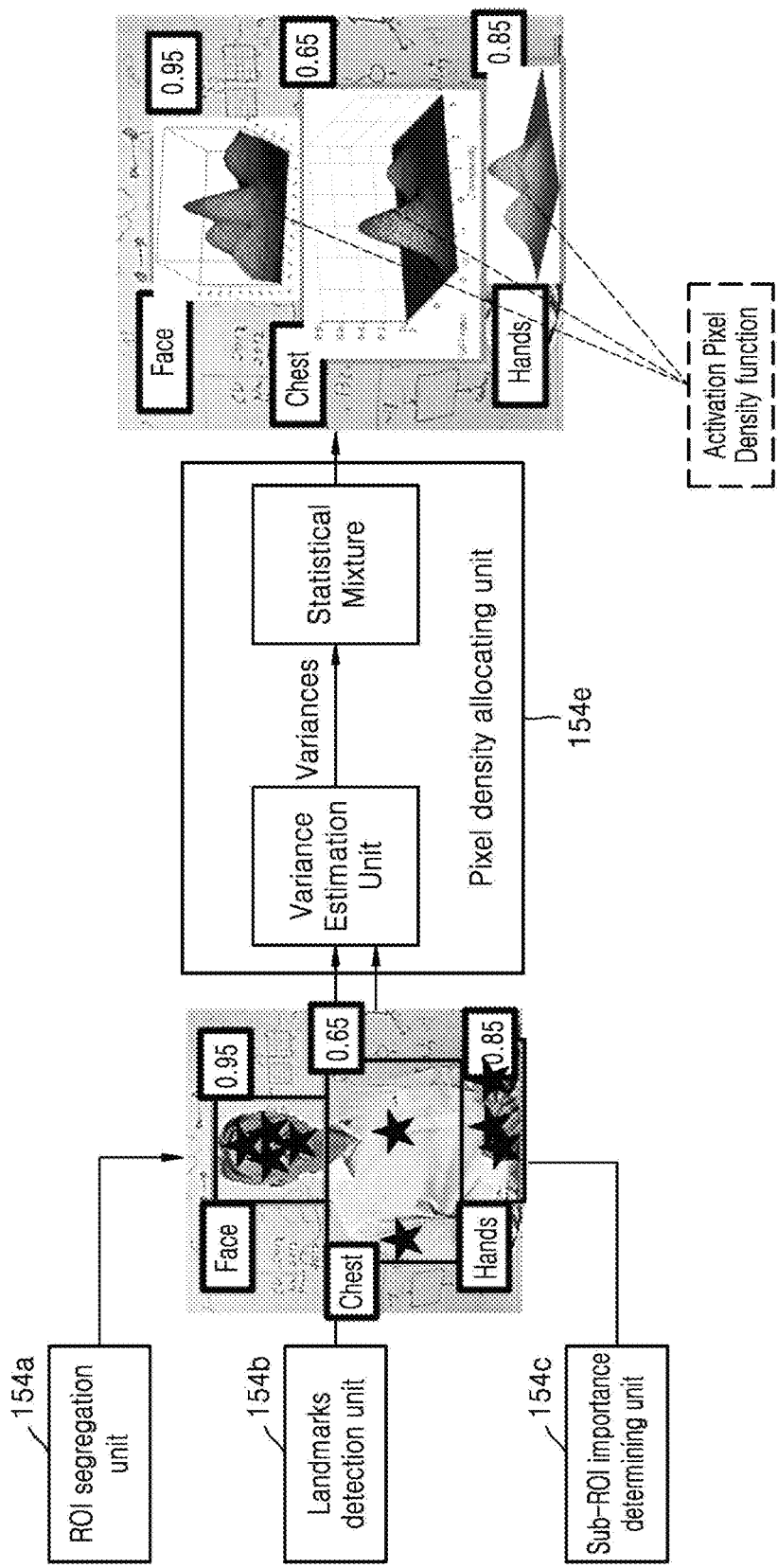
FIG. 5C illustrates functioning of a pixel density allocating unit, according to an embodiment of the disclosure.

FIG. 5C illustrates functioning of a pixel density allocating unit, according to an embodiment of the disclosure.

Referring to the FIG. 5C in conjunction with the FIG. 5A, the pixel density allocating unit 154*e* receives the input from the ROI segregation unit 154*a*, the landmarks detection unit 154*b* and the sub-ROI importance determining unit 154*c*. The pixel density allocating unit 154*e* calculates active pixel density function for each sub-ROI as a mixture of Gaussians with each Gaussian centered at one of the landmarks. Further, the pixel density allocating unit 154*e* also determines the variance of each Gaussian intelligently as per the respective landmark's relative importance.

Figure 6A:
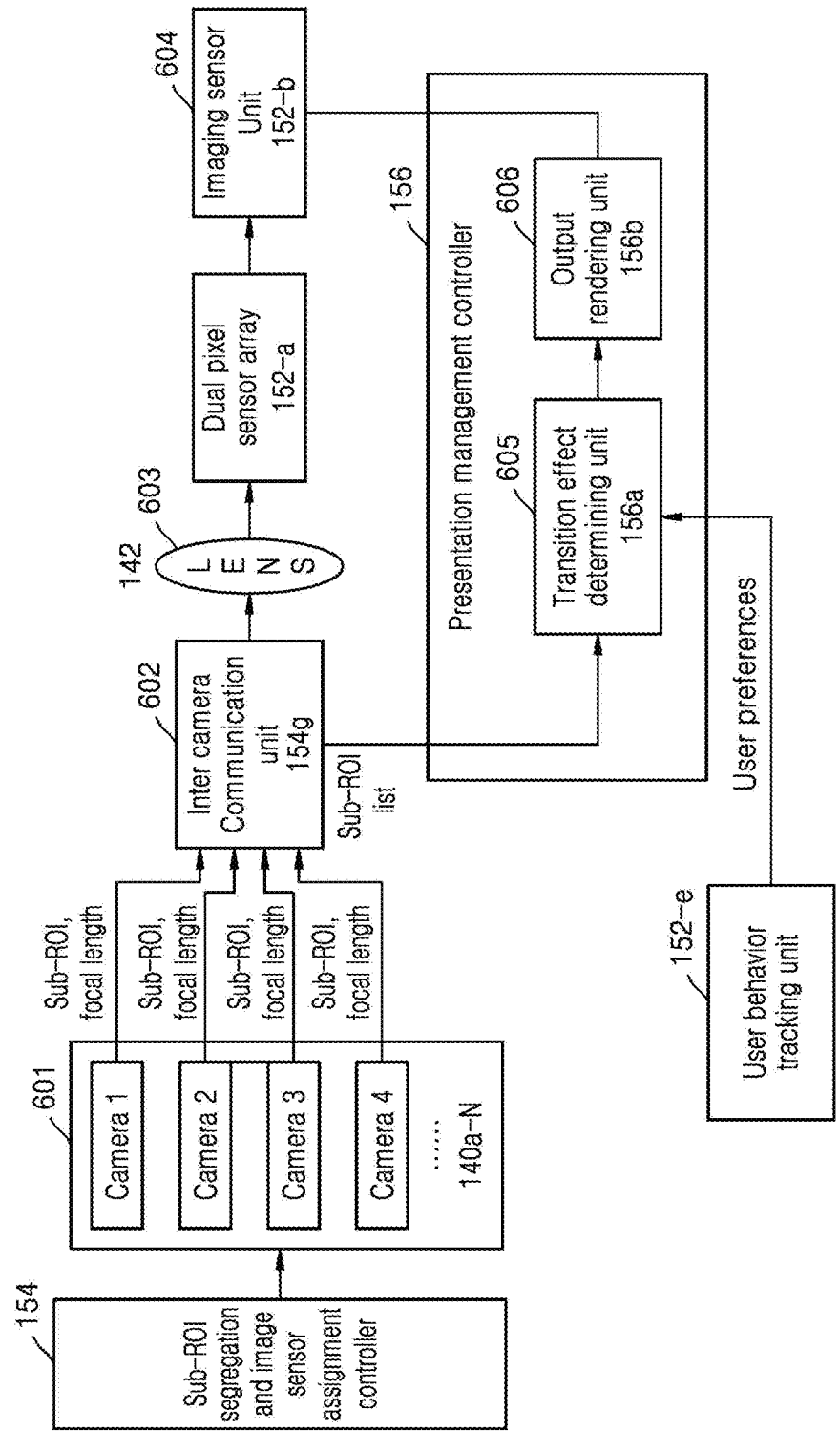
FIG. 6A illustrates various functions performed by a presentation management controller, according to an embodiment of the disclosure.

FIG. 6A illustrates various functions performed by a presentation management controller, according to an embodiment of the disclosure.

Referring to the FIG. 6A, at operation 601, the image sensors 140a-N receives the input from the sub-ROI segregation and image sensor assignment controller 154 which indicates specific camera to focus on specific sub-ROI. Further, the output from each of the image sensors 140a-N is sent to the inter camera communication unit 154g which sends the sub-ROI list to both a transition effect determining unit 156a of the presentation management controller 156 and the lens 142 in operation 602. Further, at operation 603, the lens 142 captures the sub-ROI and at operation 604, the dual pixel sensor array 152-a sends the sensor data to the imaging sensor unit 152-b. At operation 605, the transition effect determining unit 156a also receives the user preferences and determines the effects which may needs to be applied while transition the content to be rendered. At operation 606, the focused content is sent to an output rendering unit 156b which displays the auto-focused content on the display 160 of the electronic device 100.

Figure 6B:
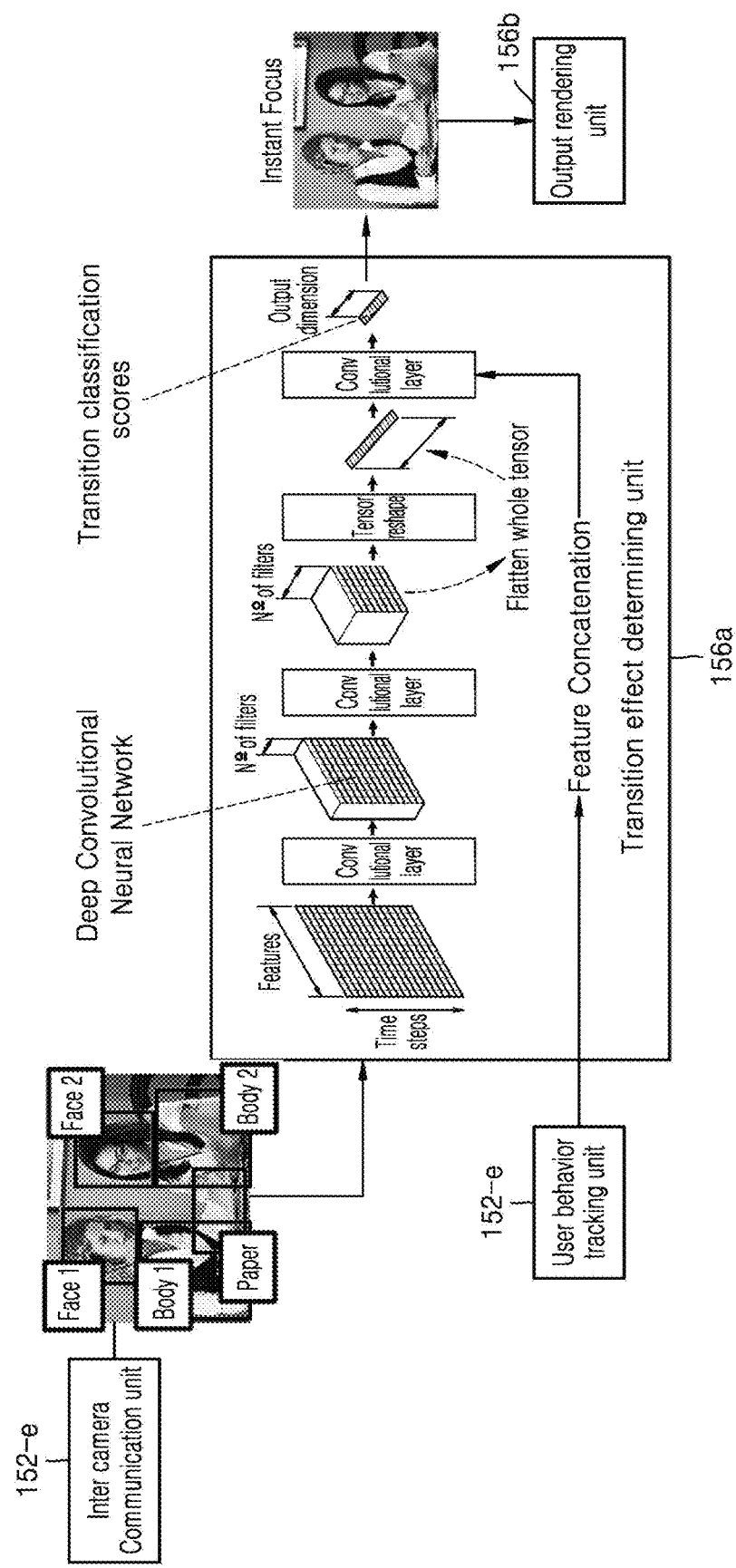
FIG. 6B illustrates various functions performed by a transition effect determining unit, according to an embodiment of the disclosure.

FIG. 6B illustrates various functions performed by a transition effect determining unit, according to an embodiment of the disclosure.

Referring to the FIG. 6B, the transition effect determining unit 156a is a deep convolutional neural network. The transition effect determining unit 156a receives the output from the inter camera communication unit 154g and the user preferences from the user behavior tracking unit 152-e. The user preference includes instant focus, ordered focus and animation.

Both the input features are concatenated and the instant focus is determined and applied to the final image. Then the focused image is rendered on the output rendering unit 156b.

Figure 7A:
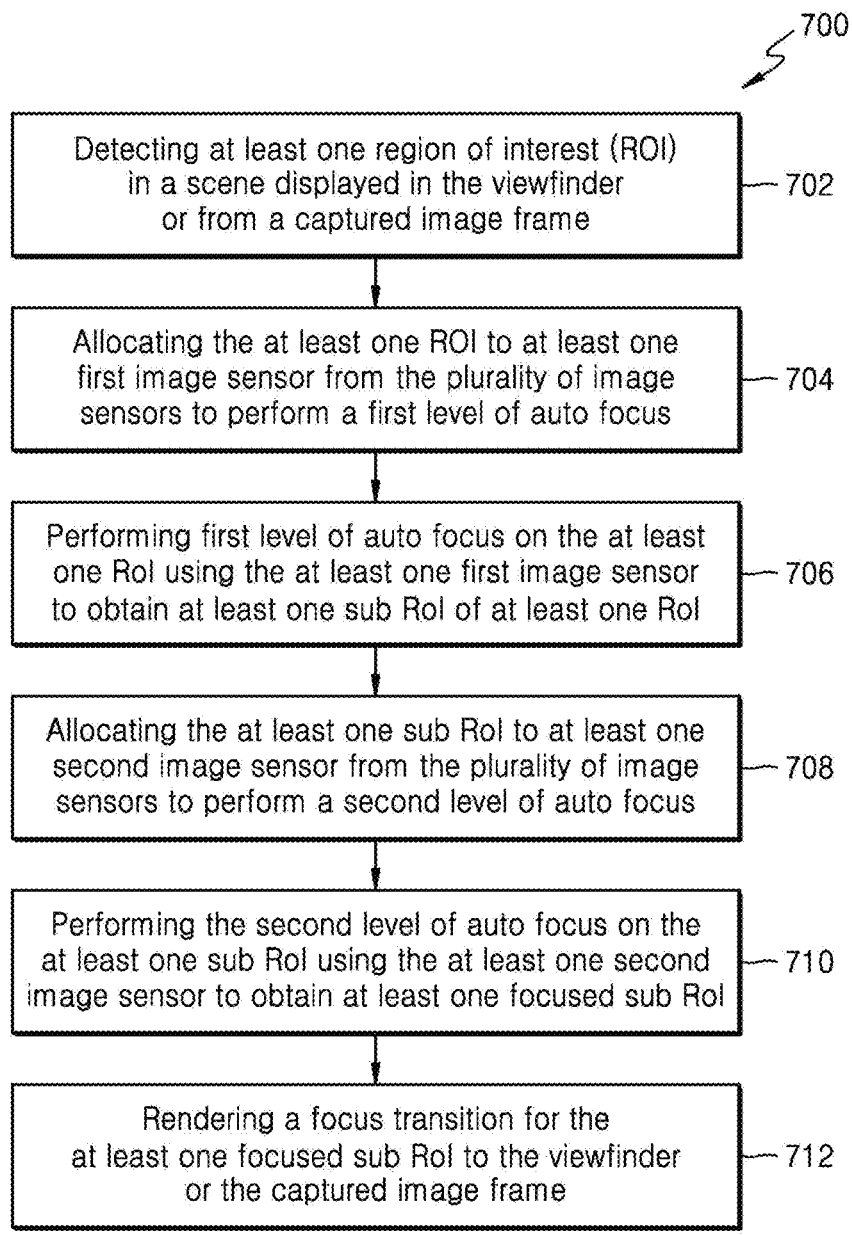
FIGS. 7A, 7B, 7C, 7D, 7E, and 7F are flow diagrams illustrating a sequence of operations for two levels of auto focus with respect to an electronic device, according to various embodiments of the disclosure.

FIG. 7A to 7F are flow diagrams illustrating a sequence of operations for two levels of auto focus with respect to an electronic device, according to various embodiments of the disclosure. FIG. 7A illustrates the overall method flow.

Referring to FIG. 7, at operation 702, the method includes the electronic device 100 detecting the ROI in the scene displayed in the viewfinder or from a captured image frame. For example, in the electronic device 100 described in the FIG. 3, the focus optimization controller 150 is configured to detect the ROI in the scene displayed in the viewfinder or from a captured image frame.

At operation 704, the method includes the electronic device 100 allocating the ROI to the first image sensor 140a from the plurality of image sensors 140a-N to perform the first level of the auto focus. For example, in the electronic device 100 described in the FIG. 3, the focus optimization controller 150 is configured to allocate the ROI to the first image sensor 140a from the plurality of image sensors 140a-N to perform the first level of the auto focus.

At operation 706, the method includes the electronic device 100 performing the first level of auto focus on the at least one RoI using the first image sensor 140a to obtain the at least one sub RoI of at least one RoI For example, in the electronic device 100 described in the FIG. 3, the focus optimization controller 150 is configured to perform the first level of auto focus on the at least one RoI using the first image sensor 140a to obtain the at least one sub RoI of the RoIs.

At operation 708, the method includes the electronic device 100 allocating the at least one sub RoI to the at least one second image sensor 140b from the plurality of image sensors 140a-N to perform the second level of the auto focus. For example, in the electronic device 100 described in the FIG. 3, the focus optimization controller 150 is configured to allocate the at least one sub RoI to the at least one second image sensor 140b from the plurality of image sensors 140a-N to perform the second level of the auto focus.

At operation 710, the method includes the electronic device 100 performing the second level of auto focus on the at least one sub RoI using the at least one second image sensor 140b to obtain the at least one focused sub RoI. For example, in the electronic device 100 described in the FIG. 3, the focus optimization controller 150 is configured to perform the second level of auto focus on the at least one sub RoI using the at least one second image sensor 140b to obtain the at least one focused sub RoI.

At operation 712, the method includes the electronic device 100 rendering the focus transition for the at least one focused sub RoI to the viewfinder or the captured image frame. For example, in the electronic device 100 described in the FIG. 3, the focus optimization controller 150 is configured to render the focus transition for the at least one focused sub RoI to the viewfinder or the captured image frame.

The various actions, acts, blocks, operations, or the like in the method 700 may be performed in the order presented, in a different order or simultaneously. Further, in some embodiments, some of the actions, acts, blocks, operations, or the like may be omitted, added, modified, skipped, or the like without departing from the scope of the disclosure.

Figure 7B:
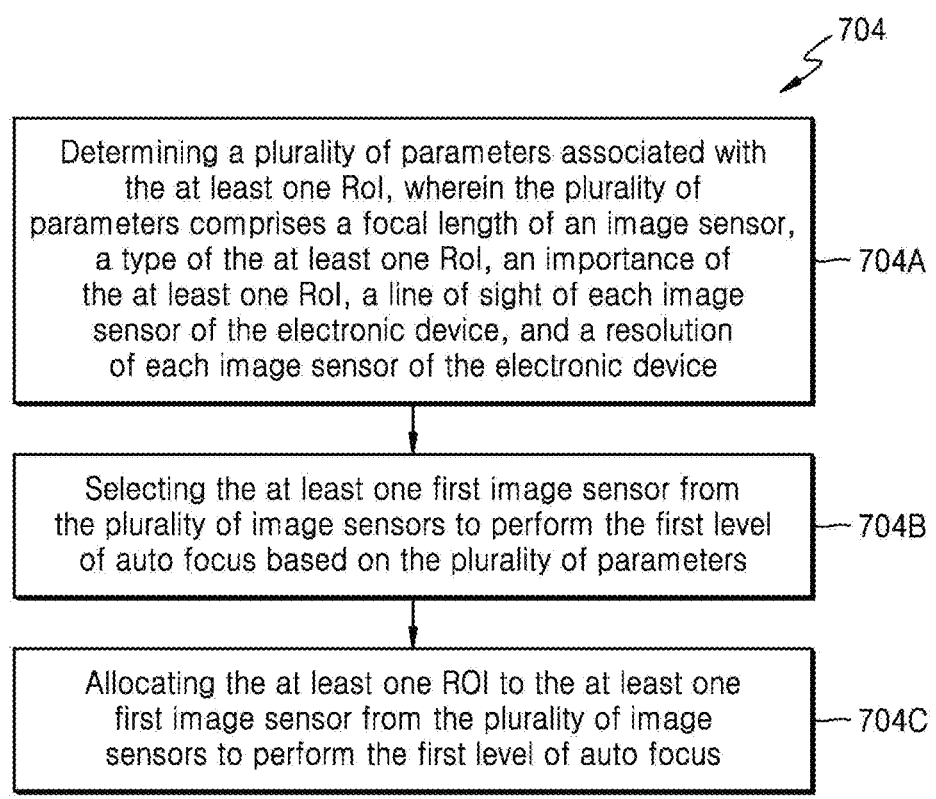
Figure 7C:
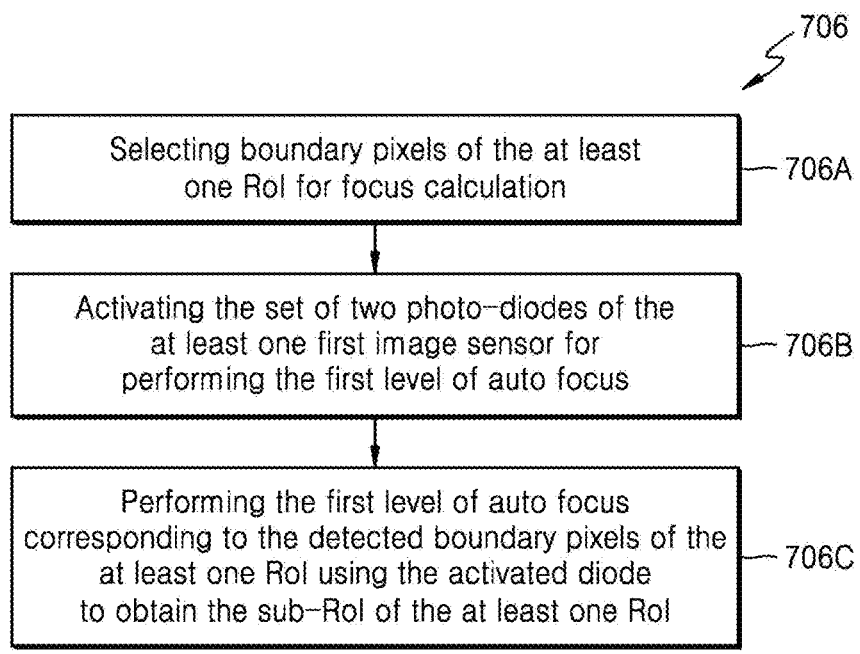
Figure 7D:
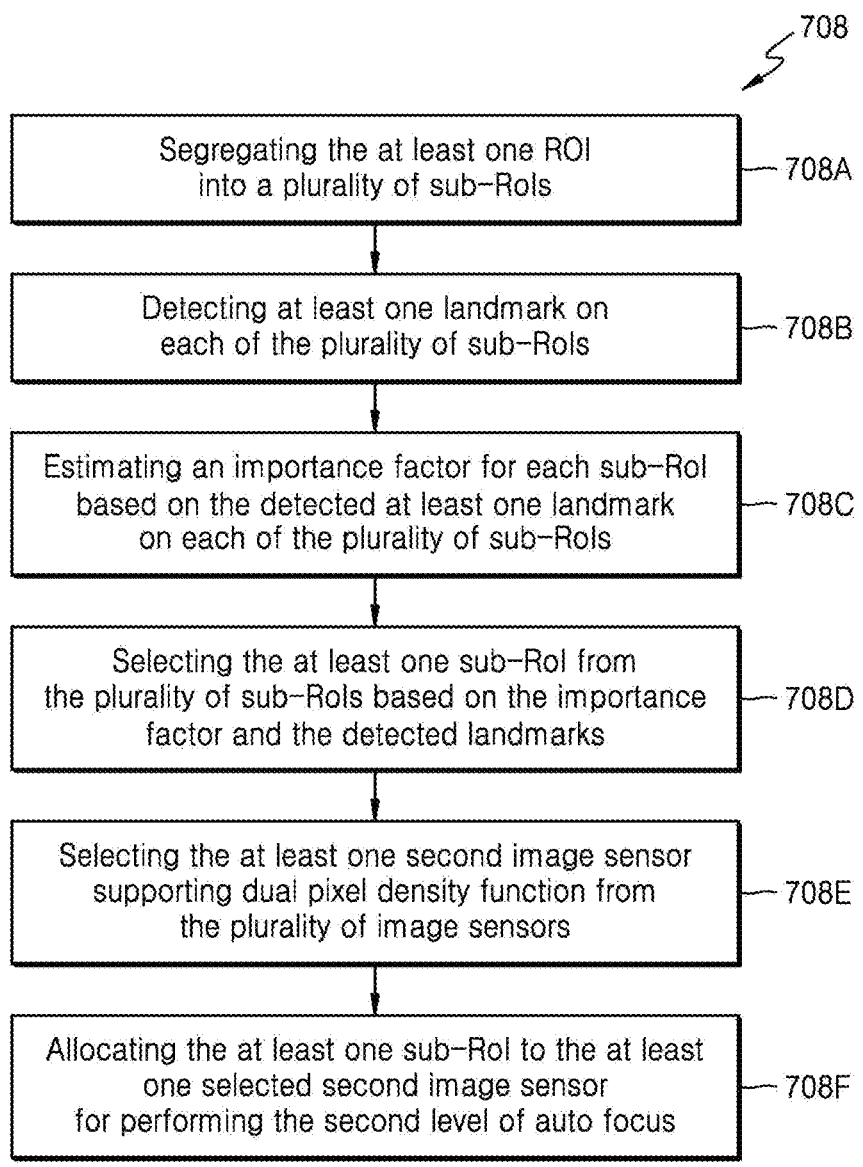

FIG. 7B further illustrates the operation 704. At operation 704A, the plurality of parameters associated with the at least one ROI is determined, wherein the plurality of parameters comprises a focal length of an image sensor, a type of the at least one ROI, an importance of the at least one ROI, a line of sight of each image sensor of the electronic device 100, and a resolution of each image sensor of the electronic device 100. At operation 704B, the at least one first image sensor 140a from the plurality of image sensors 140a-N is selected to perform the first level of auto focus based on the plurality of parameters. At operation 704C, the at least one ROI to the at least one first image sensor from the plurality of image sensors 140a-N is allocated to perform the first level of auto focus.

Based on the image sensor allotted, boundaries for each of the ROI s are further detected and appropriately the corresponding dual pixels in the dual pixel array are activated. Phase detection auto focus is performed on the selected camera to get a sub-optimal focused image at operation 706 of FIG. 7A. The sub-optimal focused image is further sent to the ROI segregation unit 154a and pixel density allocating unit 154e. The ROI is segregated into a plurality of sub-ROIs. At least one landmark is detected on each of the plurality of the sub-ROIs. An importance factor is estimated by a sub-ROI importance determining unit based on user preferences and reference images similar to the landmark detected. This is further illustrated in FIG. 7C. At operation 706A, boundary pixels of the ROI are detected for auto focus. A corresponding dual pixel photo-diode set in the dual pixel array is activated at operation 706B. The first level of auto focus is performed corresponding to the detected boundary pixels of the at least one ROI using the activated diode to obtain the sub-ROI of the at least one ROI.

At operation 708 of FIG. 7A, a pixel density allocating unit is used to activate the corresponding and appropriate dual pixel sensors from the dual pixel array and subsequently allocates a camera among the plurality of cameras on the electronic device 100 such that the camera supports the pixel density function obtained from the activated dual pixels (or the set of two photo-diodes of the dual pixels). In an embodiment, the pixel density function is appropriated by the sub-ROI using Gaussian Mixture model based on the detected landmarks. This is further illustrated in FIG. 7D. At operation 708A, the at least one ROI is further segregated into a plurality of sub-ROIs.

Further operations may include detecting at least one landmark on each of the plurality of sub-ROIs (operation 708A), detecting at least one landmark on each of the plurality of sub-ROIs (operation 708B), estimating an importance factor for each sub-ROI based on the detected at least one landmark on each of the plurality of sub-ROIs (operation 708C), selecting the at least one sub-ROI from the plurality of sub-ROIs based on the importance factor and the detected landmarks (operation 708D), selecting the at least one second image sensor supporting dual pixel density function from the plurality of image sensors 140a-N, and allocating the at least one sub-ROI to the at least one selected second image sensor for performing the second level of auto focus (Operations 708E and 708F).

Figure 7E:
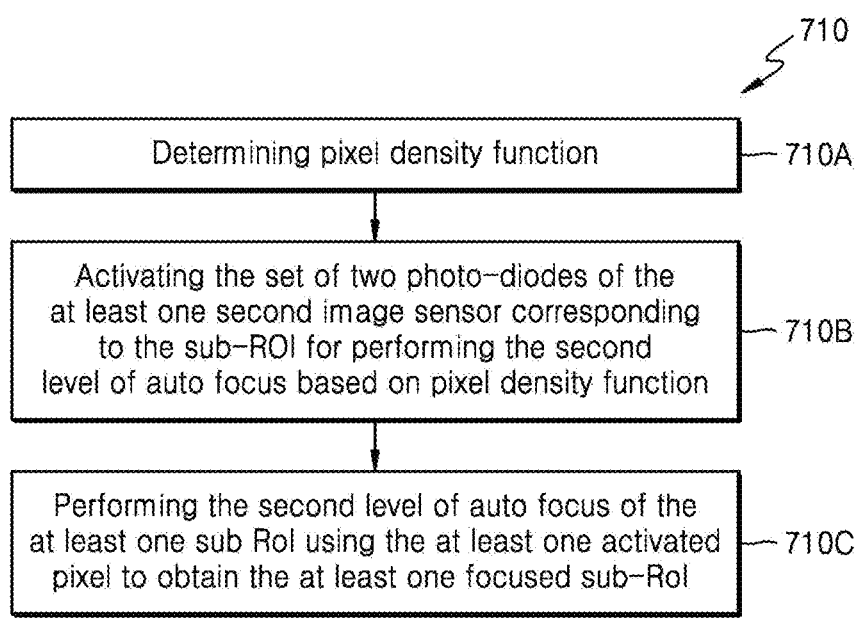

Using the camera allotted and the activated dual pixel sensors, the second level of autofocus corresponding to the detected boundary pixels of the sub ROI using the activated photo-diodes to obtain a focused sub-ROI at operation 710 of FIG. 7A. As FIG. 7E illustrates, the operations for performing the second level of auto focus include determining the pixel density function (operation 710A), activating the set of two photo-diodes of the at least one second image sensor corresponding to the sub-ROI for performing the second level of auto focus based on the determined pixel density function (operation 710B), and performing the second level of auto focus corresponding to the detected boundary pixels of the at least one sub ROI using the at least one activated diode to obtain the at least one focused sub-ROI (operation 710C).

Figure 7F:
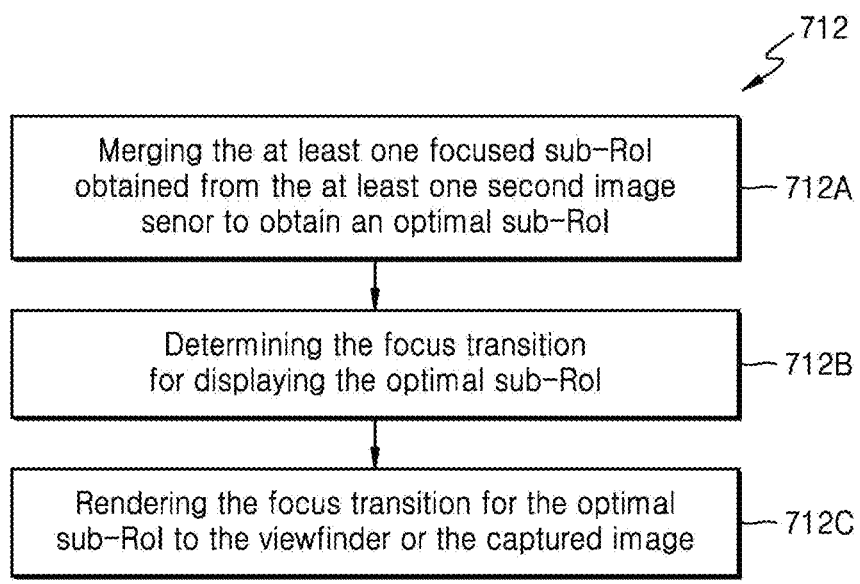

Subsequently the focused sub-ROI is merged with the input scene by the presentation management controller 156 at operation 712 of FIG. 7A. A transition effect determining unit is used to merge the focused sub-ROIs based on user preferences and the importance factors and subsequently provided to the viewfinder or the camera lens of the electronic device ready to be captured as a stored image. As illustrated in FIG. 7F, operations include merging the at least one focused sub-RoI obtained from the at least one second image senor to obtain an optimal sub-RoI (operation 712A), determining the focus transition for displaying the optimal sub-RoI (operation 712B), and rendering the focus transition for the optimal sub-RoI to the viewfinder or the captured image (operation 712C).

Figure 8A:
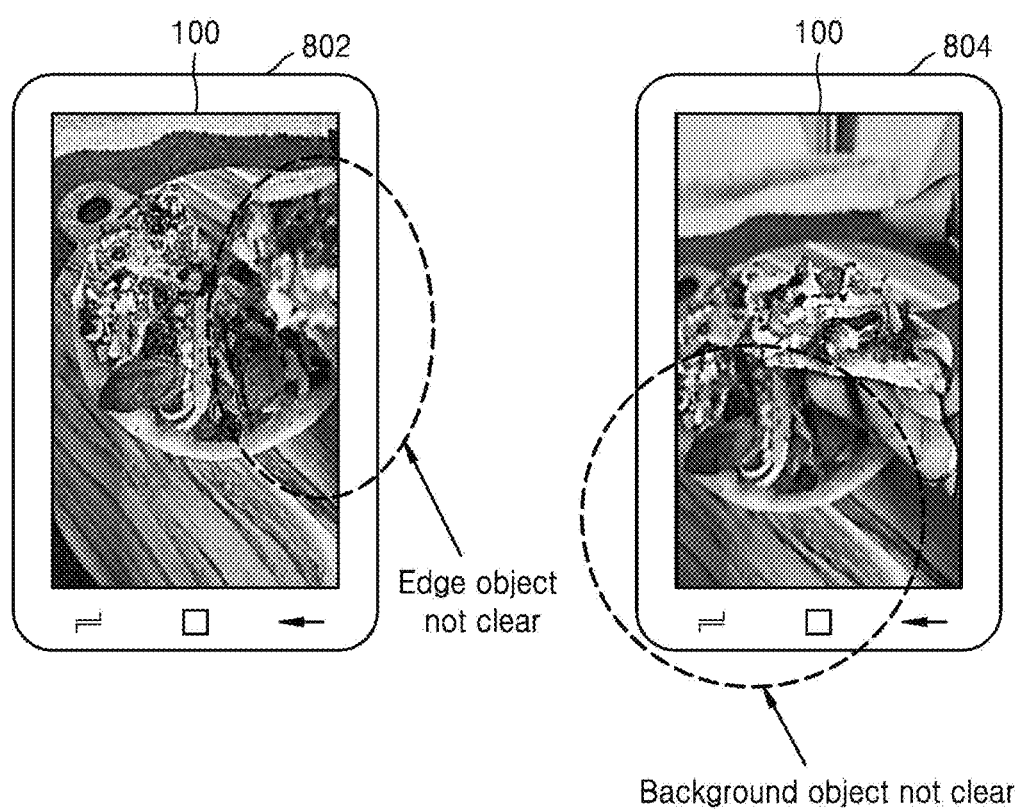

FIGS. 8A and 8B are examples illustrating multiple ROIs with different Z orders being captured by an electronic device, according to an embodiment of the disclosure.

Referring to FIGS. 8A and 8B, at operation 802, consider an image comprising two related objects such as for example two slices of pizza where one is placed on a table and the other is held by a user. The slide held by the user is at an edge of the image and hence not focused when the image is captured using existing methods and systems. At operation 804, consider another scenario where the object in the background (slice of the pizza placed on the table) is related to the object ahead i.e., the slice held by the user. Yet the slice in the background is not focused when the image is captured using existing methods and systems.

Consider the image is captured using the proposed method. At operation 806, the electronic device 100 uses the first image sensor 140a and the second image sensor 140b for intelligent dual pixel capture of both the slices of the pizza in the image. The electronic device 100 intelligently determines the ROI in the image as the region comprising both the slices of the pizza. Further, the electronic device 100 also determines the sub-ROIs as the slice of the pizza in the background (operation 808) and the slice of the pizza held by the user (operation 810). Then the electronic device 100 allocates pixel density function for each of the sub ROIs based on the landmarks in the image.

Further, the sub-ROI comprising the pizza slice in the background is allocated to the first image sensor 140a and the sub-ROI comprising the slice of the pizza held by the user is allocated to the second image sensor 140b. At operation 812, the electronic device 100 merges the output from the first image sensor 140a and the second image sensor 140b. The electronic device 100 also determines the transition effect to be applied for the final image and displays the final image with focus on both the objects in the image on the screen of the electronic device 100.

Figure 9:
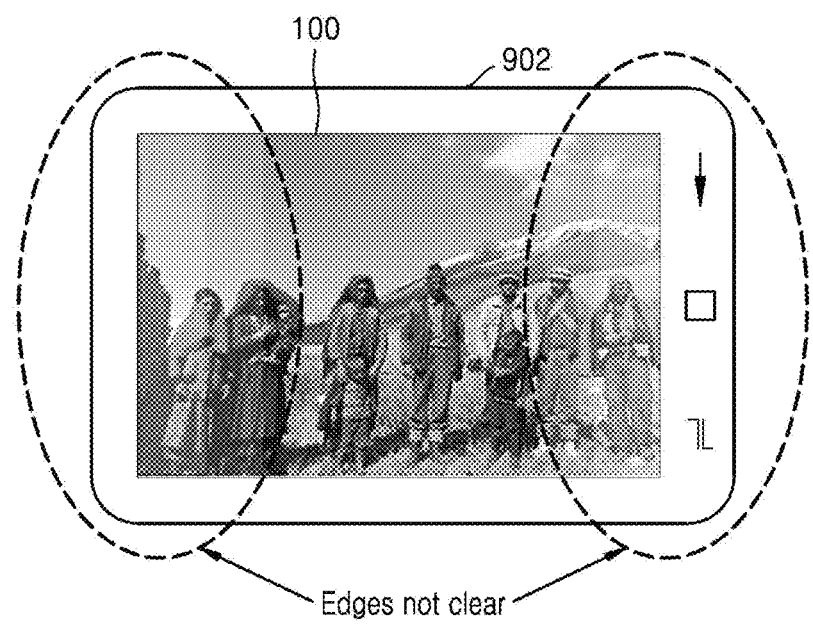
FIG. 9 is an example illustrating a comparison of capturing of content in an edge of images by an electronic device, according to an embodiment of the disclosure.
Figure 9:
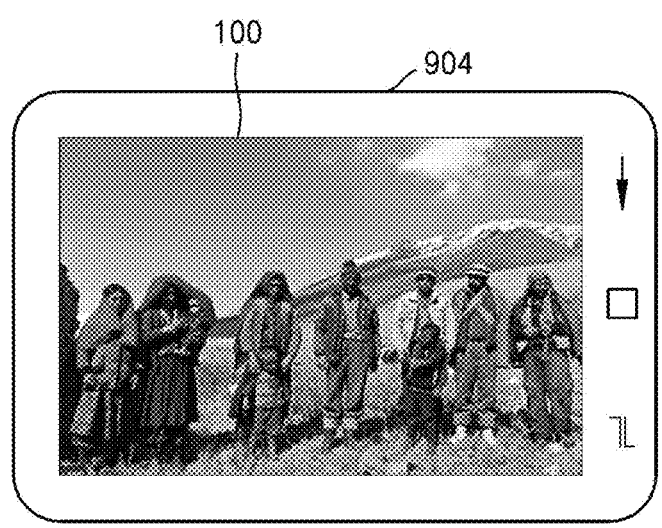

FIG. 9 is an example illustrating a comparison of capturing of content in the edge of the images by an electronic device, according to an embodiment of the disclosure.

Referring to the FIG. 9, at operation 902, the image is capturing using the existing dual pixel phase detection and auto focus capture where all the dual pixels are considered. The focus on the edge pixels is not efficient due less amount of the light falling on the photodiodes on the edges.

At operation 904, the electronic device 100 captures the image by using the proposed method which selectively activates the dual pixels in the dual pixel array only in the ROI from the main camera. If the image is not focused, then another processing operation is applied in which the dual pixels of the secondary camera which has a bigger depth of view is used. Therefore, unlike to the conventional methods and systems, in the proposed method the edges can be focused using the data from the secondary camera.

Figure 10:
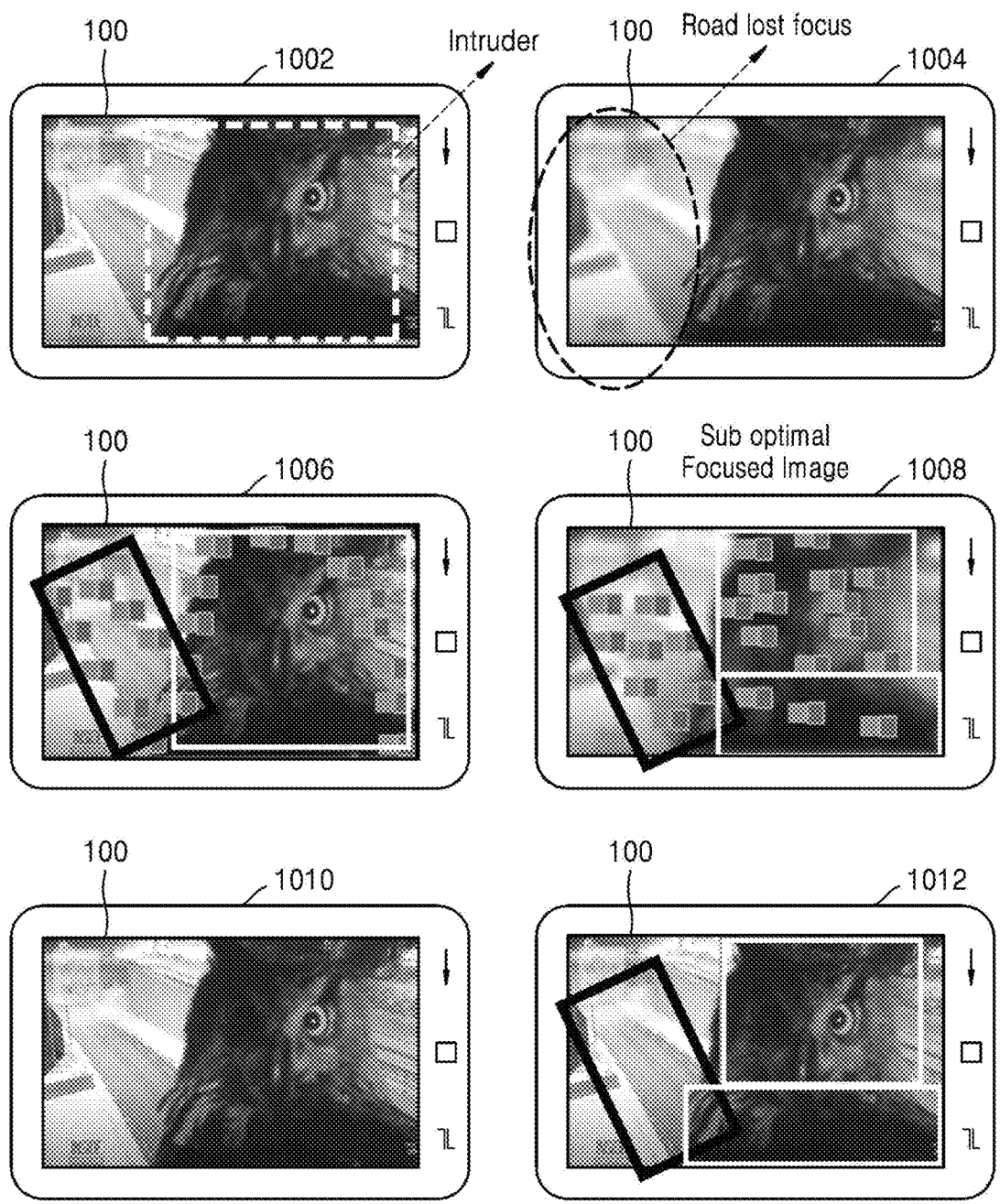
FIG. 10 is an example illustrating capture of a sudden intruding object by an electronic device, according to an embodiment of the disclosure.

FIG. 10 is an example illustrating the capture of a sudden intruding object by an electronic device, according to an embodiment of the disclosure.

Consider an example scenario where the electronic device 100 is focusing on a specific road for capturing the image and suddenly an intruder such as a bird appears in front of the electronic device 100, blocking the view of the road. In the conventional method and system of capturing the image, the focus of the camera of the electronic device 100 shifts from the road to the bird as shown in operation 1004. A similar scenario may be intentionally used by unlawful entities to perform unlawful activities such as theft by using an object which shifts the focus from the background to the closer object.

In the proposed method, at operation 1006, the electronic device 100 determines the ROIs in the image along with the importance of the ROIs detected. At operation 1008, the electronic device 100 identifies the first ROI is the road, the importance factor is 0.89 and therefore, the allotted camera is the first image sensor 140a in the sub-optimal focused image. Similarly, the second ROI is the owl, the importance factor is 0.75 and therefore, the allotted camera is the second image sensor 140b. Further, at operation 1010, the electronic device 100 determines the sub ROIs in the image as the road, an Owl face and an Owl body. Also, the electronic device 100 identifies the first sub-ROI is the road, the importance factor is 0.89 and the allotted camera is the first image sensor 140a; the second sub-ROI is the Owl Face, the importance is 0.86 and the allotted camera is the second image sensor 140b and the third sub-ROI is the Owl body, the importance is 0.65 and the allotted camera is the third image sensor 140c. The proposed method includes the electronic device 100 intelligently performing the camera allotment and selectively activating the dual pixels in the dual pixel array to focus on the objects in the image. At operation 1012, the electronic device 100 merges the optimally focused image with the input scene using the presentation management controller 156 to obtain the final image where both the focus is on both the road and the owl. Therefore, unlike to the conventional methods and systems where the focus shifts when the intruder is introduced into the scene, in the proposed method the electronic device 100 focuses intelligently on both the intruder and the object being previously focused due to lesser processing.

Figure 11A:
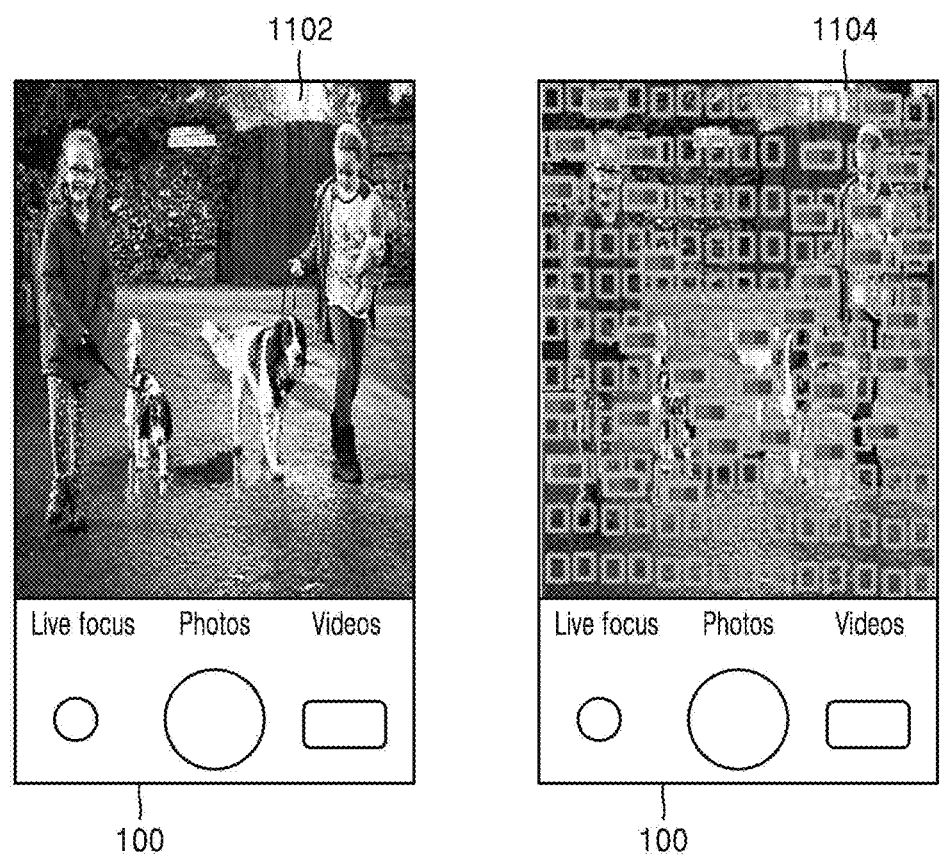
FIG. 11A illustrates a comparison of existing method and proposed method of focusing on the objects on viewfinder, according to an embodiment of the disclosure.

FIG. 11A illustrates a comparison of existing method and proposed method of focusing on the objects on the viewfinder, according to an embodiment of the disclosure.

Referring to the FIG. 11A, at operation 1102 illustrates the conventional methods of capturing the image in the simple focus when there are multiple objects (i.e., multiple ROIs) in the viewfinder. For example, in the image provided there are two persons, two dogs and a doll. Since there are multiple objects the user may want to focus on specific objects and ignore the other objects in the scene. However, the focus mechanism does not provide the options to the user.

Unlike to the conventional methods and systems, in operation 1104 the electronic device 100 intelligently determines the ROIs, the sub-ROIs, the corresponding importance of the sub-ROIs and suggests the possible combinations of the objects to which the user may want to focus in the scene. For example, in the above example case the electronic device 100 provides suggestion to the user to select from such as 1) Focus on the Persons only, 2) Focus on the persons and the dogs and 3) Focus on the persons, the dogs and the doll in the image. The user can select one of the options and the user preferred focus is applied while capturing the image. The suggestions may be provided as the proposed method is low time consuming and low processing resources are required for the same.

Figure 11B:
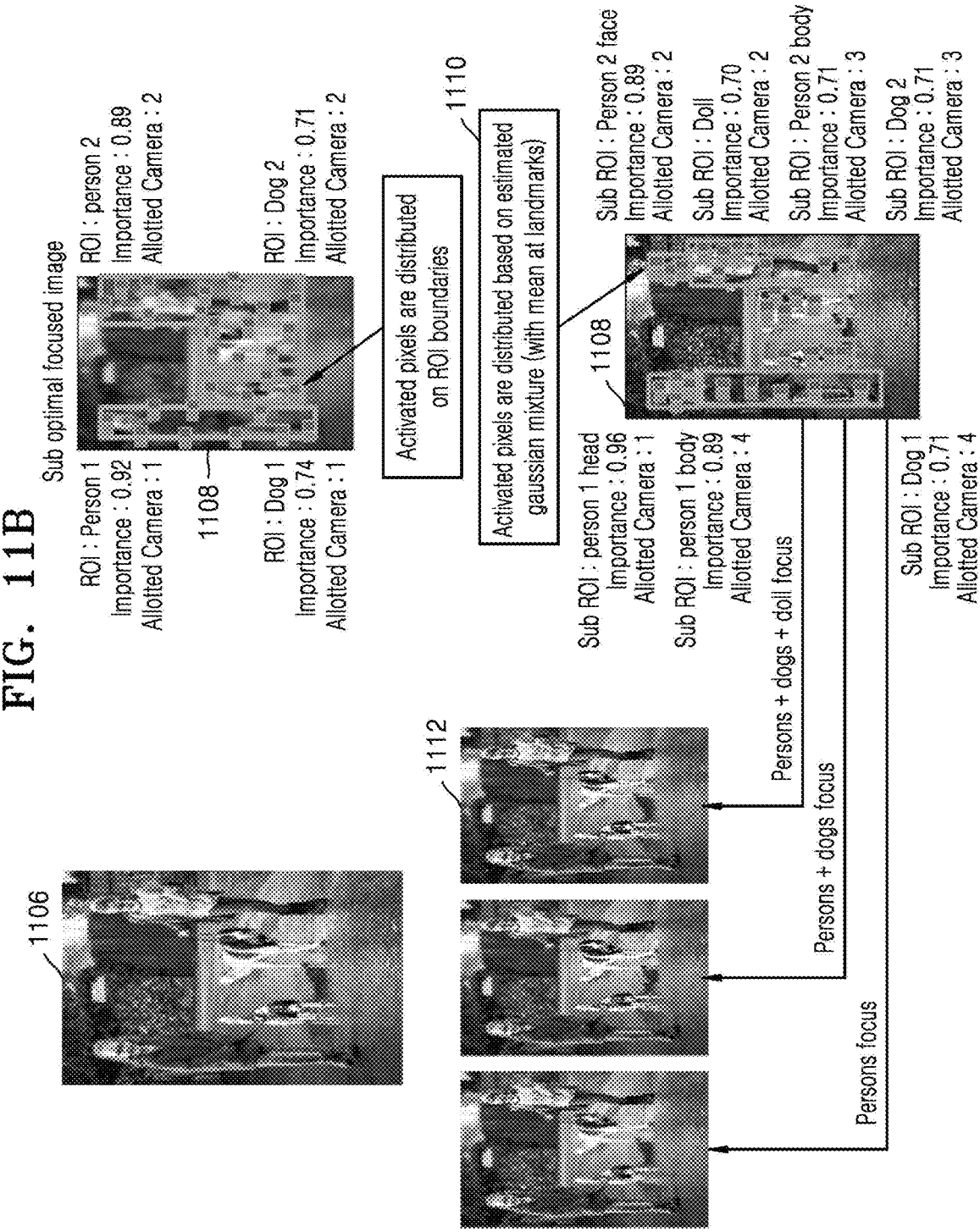
FIG. 11B is an example illustrating an operation-by-operation procedure for providing real-time suggestions for the objects to be focused on the viewfinder, according to an embodiment of the disclosure.

FIG. 11B is an example illustrating the operation-by-operation procedure for providing the real-time suggestions for the objects to be focused on the viewfinder, according to an embodiment of the disclosure.

Referring to the FIG. 11B, in conjunction to the FIG. 11, at operation 1106, the electronic device 100 detects the multiple ROIs in the scene displayed in the viewfinder and at operation 1108 determines the importance of each of the multiple ROIs, allocates the cameras for each of the ROIs in the scene. In the scene provided the electronic device 100 detects the first ROI as the person 1 with importance 0.92 and allocates the first image sensor 140a to capture the same. The second ROI is the dog 1 with importance 0.74 and allocates the first image sensor 140a to capture the dog 1. The third ROI is the person 2 with importance 0.89 and allocates the second image sensor 140b to capture the person 2 and the fourth ROI is the dog 2 with importance 0.71 and allocates the second image sensor 140b to capture the dog 2. Further, the electronic device 100 distributes the activated pixels on the ROI boundaries in operation 1110.

Further, at operation 1108 the electronic device 100 determines the sub-ROIs, further allocates optimum cameras of the multiple cameras to focus on the sub-ROIs and activated pixels are distributed based on estimated Gaussian mixture (with mean at landmarks). Further, at operation 1112, the electronic device 100 intelligently provides suggestions based on multiple combinations of the ROIs in the scene for appropriate auto focus before capturing the image or video of the input scene and the user can select in real-time in the viewfinder.

Figure 12:
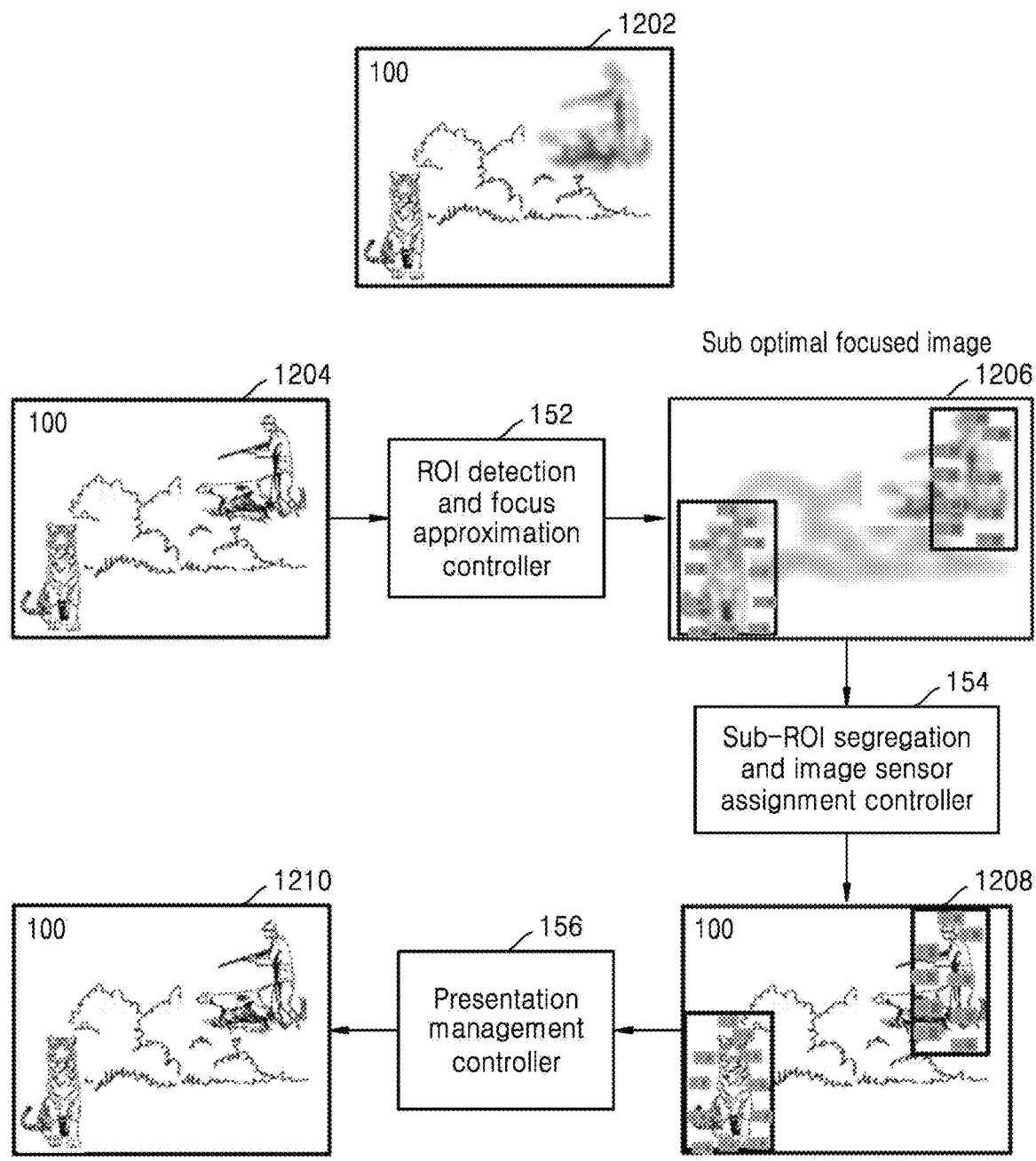
FIG. 12 is an example illustrating a scenario of threat identification in the scene by the electronic device, according to an embodiment of the disclosure.

FIG. 12 is an example illustrating a scenario of threat identification in the scene by the electronic device 100, according to an embodiment of the disclosure.

Referring to FIG. 12, in the related art, auto focus systems fail to recognize threats in distance as illustrated in operation 1202. In accordance with the disclosure, tiger, surrounding environment and the threat are consistently focused. ROIs with global importance like crime, havoc etc. are given a high importance factor helping in faster threat identification in operation 1204. As illustrated operation 1206, the electronic device 100 determines the multiple ROIs in the input scene which are the tiger and the threat (hunter and hunting dog) using the image sensors 140a-N and the ROI detection and focus approximation controller 152. At operation 1208, the sub-ROI segregation and image sensor assignment controller 154 determines the importance factors and the sub-ROIs. The hunter and hunting dog are given higher importance. Accordingly optimum cameras are allotted to focus on the sub-ROI and the corresponding dual pixels activated. At operation 1210, an optimally focused image is obtained and the optimally focused image is merged with the input scene by the electronic device 100.

In another example, current dual pixel autofocus system faces problem to track objects with very fast paced motion due to higher processing in a grid and so loses focus on fast paced objects. The proposed method improves autofocusing speed due to low computation while offering accurate focus and greatly improves the seamless focus tracking in fast paced scenes.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for auto focus of a scene by an electronic device comprising a plurality of image sensors, the method comprising:
   determining, by the electronic device, at least one region of interest (ROI) in the scene displayed in one of a viewfinder and a captured image frame;
   determining, by the electronic device, at least one sub-ROI in the at least one ROI by performing a first level of auto focus on the at least one ROI using at least one first image sensor of the plurality of image sensors;
   determining, by the electronic device, at least one focused sub-ROI by performing a second level of auto focus on the at least one sub-ROI using at least one second image sensor of the plurality of image sensors; and
   rendering, by the electronic device, a focus transition for the at least one focused sub-ROI to one of the viewfinder and the captured image frame.

2. The method of claim 1, wherein the determining of the at least one sub-ROI in the at least one ROI by performing the first level of auto focus on the at least one ROI using the at least one first image sensor of the plurality of image sensors comprises:
   determining, by the electronic device, a relative importance factor for each of the at least one ROI;
   allocating, by the electronic device, the at least one ROI to the at least one first image sensor based on the relative importance factor and a plurality of parameters;
   selecting, by the electronic device, dual pixels using a pixel density function to focus on of the at least one ROI for focus calculation;

activating, by the electronic device, a set of two photodiodes of the at least one first image sensor corresponding to the selected dual pixels for performing the first level of auto focus;

performing, by the electronic device, the first level of auto focus corresponding to the selected dual pixels of the at least one ROI using an activated diode; and determining, by the electronic device, the at least one sub-ROI in the at least one ROI based on the first level of auto focus performed on the at least one ROI.

3. The method of claim 2, wherein the selected dual pixels are located at a boundary of the at least one ROI.

4. The method of claim 2, wherein the determining of the relative importance factor for each of the at least one ROI comprises:

determining, by the electronic device, a semantic relevance of the at least one ROI to the scene;

determining, by the electronic device, at least one object in the at least one ROI and a user preference with respect to the determined at least one object;

concatenating, the semantic relevance of the at least one ROI, the at least one object in the at least one ROI and the user preference with respect to the determined at least one object; and determining, by the electronic device, the relative importance factor for each of the at least one ROI based on the concatenation.

5. The method of claim 2, wherein the allocating of the at least one ROI to the at least one first image sensor based on the relative importance factor and the plurality of parameters comprises:

determining, by the electronic device, the plurality of parameters associated with the at least one ROI, the plurality of parameters comprising a focal length of an image sensor, a type of the at least one ROI, the importance of the at least one ROI, a line of sight of each image sensor of the electronic device, and a resolution of each image sensor of the electronic device;

selecting, by the electronic device, the at least one first image sensor from the plurality of image sensors to perform the first level of auto focus based on the plurality of parameters; and allocating, by the electronic device, the at least one ROI to the at least one first image sensor from the plurality of image sensors to perform the first level of auto focus.

6. The method of claim 1, wherein the determining of the at least one focused sub-ROI by performing the second level of auto focus on the at least one sub-ROI using the at least one second image sensor of the plurality of image sensors comprises:

allocating, by the electronic device, the at least one sub-ROI to at least one second image sensor from the plurality of image sensors to perform the second level of auto focus;

selecting, by the electronic device, dual pixels using a pixel density function to focus on the at least one sub-ROI for focus calculation;

activating, by the electronic device, a set of two photodiodes of the at least one second image sensor corresponding to the selected dual pixels for performing the second level of auto focus; and performing, by the electronic device, the second level of auto focus corresponding to the selected dual pixels of the at least one sub-ROI using at least one activated pixel to obtain the at least one focused sub-ROI.

7. The method of claim 6,
wherein the pixel density function is determined as an active pixel density function for the at least one focused sub-ROI as a mixture of Gaussians, and
wherein with each Gaussian is centered at a landmark.

8. The method of claim 6, wherein the allocating of the at least one sub-ROI to at least one second image sensor from the plurality of image sensors to perform the second level of auto focus comprises:

segregating, by the electronic device, the at least one ROI into a plurality of sub-ROIs;

detecting, by the electronic device, at least one landmark on each of the plurality of sub-ROIs;

estimating, by the electronic device, an importance factor for each sub-ROI based on the detected at least one landmark on each of the plurality of sub-ROIs;

selecting, by the electronic device, the at least one sub-ROI from the plurality of sub-ROIs based on the importance factor and the detected at least one landmark;

selecting, by the electronic device, the at least one second image sensor supporting dual pixel density function from the plurality of image sensors; and allocating, by the electronic device, the at least one sub-ROI to the at least one selected second image sensor for performing the second level of auto focus.

9. The method of claim 8, wherein the estimating of the importance factor for each sub-ROI based on the detected at least one landmark on each of the plurality of sub-ROIs comprises:

determining, by the electronic device, a number of ROIs detected in the sub-ROI;

determining, by the electronic device, a user preference corresponding to the sub-ROI; and estimating, by the electronic device, the importance factor for the sub-ROI using the number of ROIs detected in the sub-ROI and the user preference corresponding to the sub-ROI.

10. The method of claim 9, wherein the focus transition is determined based on at least one of a user preference and a hierarchy important of the at least one ROI, a type of the at least one ROI, or an importance of the at least one ROI.

11. The method of claim 1, wherein the rendering of the focus transition for the at least one focused sub-ROI to one of the viewfinder and the captured image frame comprises:

merging, by the electronic device, the at least one focused sub-ROI obtained from the at least one second image sensor to obtain an optimal sub-ROI;

determining, by the electronic device, the focus transition for displaying the optimal sub-ROI; and rendering, by the electronic device, the focus transition for the optimal sub-ROI to one of the viewfinder and the captured image.

12. A non-transitory computer-readable recording medium having recorded thereon a program for executing, the method of claim 1.

13. An electronic device for auto focus of a scene, wherein the electronic device comprises:

a plurality of image sensors;
a memory;
a processor coupled to the memory;
a communicator coupled to the memory and the processor; and
a focus optimization controller coupled to the memory, the processor and the communicator, wherein the focus optimization controller configured to:
    determine at least one region of interest (ROI) in the scene displayed in one of a viewfinder and a captured image frame,
    determine at least one sub-ROI in the at least one ROI by performing a first level of auto focus on the at least one ROI using at least one first image sensor of the plurality of image sensors,
    determine at least one focused sub-ROI by performing a second level of auto focus on the at least one sub-ROI using at least one second image sensor of the plurality of image sensors, and
    render a focus transition for the at least one focused sub-ROI to one of the viewfinder and the captured image frame.

14. The electronic device of claim 13, wherein the focus optimization controller is further configured, when determining the at least one sub-ROI in the at least one ROI by performing the first level of auto focus on the at least one ROI using the at least one first image sensor of the plurality of image sensors, to:
    determine a relative importance factor for each of the at least one ROI;
    allocate the at least one ROI to the at least one first image sensor based on the relative importance factor and a plurality of parameters;
    select dual pixels using a pixel density function to focus on of the at least one ROI for focus calculation;
    activate a set of two photo-diodes of the at least one first image sensor corresponding to the selected dual pixels for performing the first level of auto focus;
    perform the first level of auto focus corresponding to the selected dual pixels of the at least one ROI using an activated diode; and
    determine the at least one sub-ROI in the at least one ROI based on the first level of auto focus performed on the at least one ROI.

15. The electronic device of claim 14, wherein the selected dual pixels are located at a boundary of the at least one ROI.

16. The electronic of claim 14, wherein the focus optimization controller is further configured, when determining the relative importance factor for each of the at least one ROI, to:
    determine a semantic relevance of the at least one ROI to the scene;
    determine at least one object in the at least one ROI and a user preference with respect to the determined at least one object;
    concatenate the semantic relevance of the at least one ROI, the at least one object in the at least one ROI and the user preference with respect to the determined at least one object; and
    determine the relative importance factor for each of the at least one ROI based on the concatenation.

17. The electronic device of claim 14, wherein the focus optimization controller is further configured, when allocating the at least one ROI to the at least one first image sensor based on the relative importance factor and the plurality of parameters, to:
    determine the plurality of parameters associated with the at least one ROI, wherein the plurality of parameters comprises a focal length of an image sensor, a type of the at least one ROI, the importance of the at least one ROI, a line of sight of each image sensor of the electronic device, and a resolution of each image sensor of the electronic device;
    select the at least one first image sensor from the plurality of image sensors to perform the first level of auto focus based on the plurality of parameters; and
    allocate the at least one ROI to the at least one first image sensor from the plurality of image sensors to perform the first level of auto focus.

18. The electronic device of claim 13, wherein the focus optimization controller is further configured, when determining the at least one focused sub-ROI by performing the second level of auto focus on the at least one sub-ROI using the at least one second image sensor of the plurality of image sensors comprises, to:
    allocate the at least one sub-ROI to at least one second image sensor from the plurality of image sensors to perform the second level of auto focus;
    select dual pixels using a pixel density function to focus on the at least one sub-ROI for focus calculation;
    activate a set of two photo-diodes of the at least one second image sensor corresponding to the selected dual pixels for performing the second level of auto focus; and
    perform the second level of auto focus corresponding to the selected dual pixels of the at least one sub-ROI using at least one activated pixel to obtain the at least one focused sub-ROI.

19. The electronic device of claim 18, wherein the pixel density function is determined as an active pixel density function for the at least one focused sub-ROI as a mixture of Gaussians, and
    wherein with each Gaussian is centered at a landmark.

20. The electronic device of claim 18, wherein the focus optimization controller is further configured, when allocating the at least one sub-ROI to at least one second image sensor from the plurality of image sensors to perform the second level of auto focus, to:
    segregate the at least one ROI into a plurality of sub-ROIs;
    detect at least one landmark on each of the plurality of sub-ROIs;
    estimate an importance factor for each sub-ROI based on the detected at least one landmark on each of the plurality of sub-ROIs;
    select the at least one sub-ROI from the plurality of sub-ROIs based on the importance factor and the detected at least one landmark;
    select the at least one second image sensor supporting dual pixel density function from the plurality of image sensors; and
    allocate the at least one sub-ROI to the at least one selected second image sensor for performing the second level of auto focus.

* * * * *